US012681142B2

(12) United States Patent
Song et al.

(10) Patent No.: US 12,681,142 B2
(45) Date of Patent: Jul. 14, 2026

(54) RADAR APPARATUS AND SIGNAL PROCESSING METHOD THEREIN

(71) Applicant: ELECTRONICS AND TELECOMMUNICATIONS RESEARCH INSTITUTE, Daejeon (KR)

(72) Inventors: Myung Sun Song, Daejeon (KR); Hyung Ju Kim, Daejeon (KR); Sung Jin Yoo, Daejeon (KR); Byung Jang Jeong, Daejeon (KR); Seung Keun Park, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 322 days.

(21) Appl. No.: 18/504,343

(22) Filed: Nov. 8, 2023

(65) Prior Publication Data

US 2024/0175979 A1 May 30, 2024

(30) Foreign Application Priority Data

Nov. 21, 2022 (KR) ........................ 10-2022-0155995

(51) Int. Cl.
*G01S 7/35* (2006.01)
*G01S 13/34* (2006.01)

(52) U.S. Cl.
CPC ............. *G01S 7/358* (2021.05); *G01S 13/343* (2013.01)

(58) Field of Classification Search
CPC ......... G01S 7/358; G01S 13/343; G01S 13/53
(Continued)

(56) References Cited

U.S. PATENT DOCUMENTS

| | | | |
|---|---|---|---|
| 5,640,698 A * | 6/1997 | Shen | ........................ H04B 1/26 |
| | | | 455/340 |
| 5,940,029 A | 8/1999 | Ninomiya et al. | |

(Continued)

FOREIGN PATENT DOCUMENTS

| | | | | |
|---|---|---|---|---|
| EP | 0813770 B1 * | 4/2000 | ........... | H04B 1/0003 |
| EP | 2482097 B1 * | 8/2016 | ........... | G01S 13/345 |

(Continued)

*Primary Examiner* — Nuzhat Pervin
(74) *Attorney, Agent, or Firm* — LRK PATENT LAW FIRM

(57) ABSTRACT

Exemplary embodiments provide a radar apparatus having a plurality of antenna elements and enabling to reduce a number of ADCs as long as being allowable according to a bandwidth of the ADC, reduce a chip area occupied by the ADC and interconnections in an integrated circuit, and prevent a synchronization problem between the ADCs by sampling receive signals of multiple channels at once. Frequencies of local oscillation signals used for downconverting receive signals are set to be different from each other by an amount of an offset frequency, so that each of band-limited receive signals obtained through respective RF paths may occupy a different position on a frequency axis of a frequency domain. Downconverted receive signals are combined into a single signal and converted into a single digital signal stream, and a signal processing of the digital signal stream in a digital domain enables to obtain target data.

7 Claims, 11 Drawing Sheets

(58) Field of Classification Search
USPC .......................................................... 342/194
See application file for complete search history.

(56) References Cited

U.S. PATENT DOCUMENTS

| | | | | |
|---|---|---|---|---|
| 6,639,939 B1* | 10/2003 | Naden | .................... | H04B 1/707 |
| | | | | 375/140 |
| 6,807,402 B2* | 10/2004 | Weiss | ..................... | H03B 21/04 |
| | | | | 455/523 |
| 6,924,762 B2* | 8/2005 | Miyake | ................. | G01S 13/931 |
| | | | | 342/146 |
| 7,876,261 B1* | 1/2011 | Adams | .................... | G01S 7/282 |
| | | | | 342/174 |
| 9,070,972 B2* | 6/2015 | Wang | ....................... | H01Q 3/22 |
| 9,473,158 B1* | 10/2016 | Delos | ...................... | H04B 1/06 |
| 9,479,232 B1* | 10/2016 | Loui | .................... | H04B 7/0617 |
| 9,557,408 B2* | 1/2017 | Chernukhin | .......... | G01S 7/4806 |
| 9,794,048 B2* | 10/2017 | Berretta | ............ | H04W 72/0446 |
| 9,989,627 B2* | 6/2018 | Eshraghi | .............. | G01S 7/4021 |
| 10,613,195 B2* | 4/2020 | Kishigami | ........... | H04B 7/0413 |
| 10,830,867 B2* | 11/2020 | Lin | .......................... | G01S 13/86 |
| 11,175,376 B2* | 11/2021 | Melzer | .................... | G01S 7/023 |
| 11,320,516 B1* | 5/2022 | Crouch | ................. | G01S 13/325 |
| 11,327,172 B2* | 5/2022 | You | ....................... | G01S 7/0232 |
| 11,329,718 B2* | 5/2022 | Rutt | ..................... | H04B 1/0014 |
| 11,711,139 B2* | 7/2023 | Rutt | ......................... | H04B 1/40 |
| | | | | 455/73 |
| 11,867,793 B2* | 1/2024 | Kim | ......................... | G01S 13/58 |
| 12,255,729 B2* | 3/2025 | Rutt | .................... | H04B 1/0039 |
| 12,355,478 B2* | 7/2025 | Ray | .......................... | H04B 1/30 |
| 2002/0154054 A1* | 10/2002 | Small | ................... | G01S 13/106 |
| | | | | 342/201 |
| 2010/0259433 A1* | 10/2010 | Bishop | ................. | H04B 7/086 |
| | | | | 341/155 |
| 2012/0235857 A1* | 9/2012 | Kim | ...................... | G01S 13/931 |
| | | | | 342/134 |
| 2013/0234879 A1* | 9/2013 | Wilson-Langman | ........................ | |
| | | | | G01S 13/885 |
| | | | | 342/21 |
| 2014/0247181 A1* | 9/2014 | Nogueira-Nine | ..... | G01S 13/343 |
| | | | | 342/128 |

| | | | | |
|---|---|---|---|---|
| 2015/0276918 A1* | 10/2015 | Ramasubramanian | ...................... | |
| | | | | G01S 13/584 |
| | | | | 342/107 |
| 2016/0050010 A1* | 2/2016 | Buehler | ............... | H04B 7/1851 |
| | | | | 455/73 |
| 2017/0054492 A1* | 2/2017 | Buehler | ............... | H04B 7/1851 |
| 2017/0160389 A1* | 6/2017 | Vacanti | ................... | H01Q 1/42 |
| 2018/0011181 A1* | 1/2018 | Urakawa | ............... | G01S 13/343 |
| 2018/0083816 A1* | 3/2018 | Bolstad | ................ | H04L 27/265 |
| 2019/0056476 A1* | 2/2019 | Lin | ........................ | G01S 7/021 |
| 2019/0056478 A1* | 2/2019 | Millar | ..................... | H04B 1/69 |
| 2019/0195985 A1* | 6/2019 | Lin | ........................ | G01S 7/0233 |
| 2019/0317186 A1* | 10/2019 | Hayashi | .................. | G01S 7/032 |
| 2020/0132804 A1* | 4/2020 | Yeh | ......................... | G01S 7/352 |
| 2020/0150256 A1* | 5/2020 | Dent | ...................... | G01S 13/42 |
| 2020/0217924 A1* | 7/2020 | Kashiwagi | .............. | G01S 13/42 |
| 2020/0220613 A1* | 7/2020 | Rutt | ........................ | H04B 1/44 |
| 2021/0156954 A1* | 5/2021 | Rimini | .................. | H04Q 11/04 |
| 2021/0173042 A1* | 6/2021 | Wu | ......................... | G01S 7/356 |
| 2021/0173069 A1* | 6/2021 | Wu | ........................ | G01S 13/343 |
| 2021/0234609 A1* | 7/2021 | Rutt | .................. | H04B 7/18513 |
| 2021/0408696 A1* | 12/2021 | Eitan | .................... | H01Q 1/3233 |
| 2022/0260698 A1* | 8/2022 | Morikoshi | ........... | G01S 13/343 |
| 2023/0194657 A1* | 6/2023 | Gao | .......................... | G01S 7/32 |
| | | | | 342/73 |
| 2023/0324544 A1* | 10/2023 | Park | ..................... | G01S 13/343 |
| 2024/0291167 A1* | 8/2024 | Kishigami | ............. | G01S 13/42 |

FOREIGN PATENT DOCUMENTS

| | | | | |
|---|---|---|---|---|
| JP | 1999-064485 A | | 3/1999 | |
| JP | 2010530150 A | * | 9/2010 | ............ H04B 7/086 |
| KR | 10-2013-0051694 A | | 5/2013 | |
| KR | 10-2017-0053209 A | | 5/2017 | |
| KR | 10-2311699 B1 | | 10/2021 | |
| KR | 10-2022-0064219 A | | 5/2022 | |
| WO | WO-2008139219 A2 | * | 11/2008 | ............ H04B 7/086 |
| WO | 2012/032659 A1 | | 3/2012 | |
| WO | WO-2014019397 A1 | * | 2/2014 | ........ H04L 27/2649 |
| WO | WO-2016186998 A1 | * | 11/2016 | .............. G01S 3/74 |
| WO | WO-2017019378 A1 | * | 2/2017 | ............ G01S 7/023 |
| WO | 2019/131739 A1 | | 7/2019 | |

* cited by examiner

FIG. 5 d: distance between the radar and a target
c: propagating speed of wave(= speed of light)

RADAR APPARATUS AND SIGNAL PROCESSING METHOD THEREIN

CROSS-REFERENCE TO RELATED APPLICATION

The present application claims a convention priority under 35 U.S.C. § 119(a) based on Korean Patent Application No. 10-2022-0155995 filed on Nov. 21, 2022, the entire content of which is incorporated herein in its entirety by reference.

BACKGROUND

1. Technical Field

The present disclosure relates to a radar apparatus and, more particularly, to a radar apparatus using a continuous wave signal and employing multiple receive antennas. In addition, the present disclosure relates to a signal processing method in the radar apparatus.

2. Description of Related Art

Frequency-modulated continuous-wave (FMCW) radar detects a target by radiating a frequency-modulated continuous-wave signal. The FMCW radar is widely being used as a civilian radar to detect a presence of a target, a distance to the target, a speed of the target, a movement direction of the target, or an angle of arrival of the signal because of its simple system configuration despite of a low output power and a short detection range compared with a pulse radar.

FIG. 1 is a block diagram of a conventional FMCW MIMO radar using the FMCW signal and employing a multiple input multiple output (MIMO) antenna. The radar apparatus shown in FIG. 1 may include a transmit array antenna and a receive array antenna, each including a plurality of antenna elements. The antenna elements in the receive array antenna are coupled to respective receive RF blocks. Since in-phase (I) and quadrature-phase (Q) component paths are separated before a frequency conversion of a received signal to detect a phase of the signal, two downconverters are provided for each of the receive RF blocks. A downconverted receive signal is a beat signal having a frequency corresponding to a difference between the frequencies of a transmit signal and the receive signal. An analog-to-digital converter (ADC) is provided for each of the I-component and Q-component paths to change the downconverted receive signal into a digital signal.

As a result, ADCs as many as twice a number of the antennas or the RF paths are used to convert analog baseband signals into digital signals. In other words, each signal path is physically separated and a separate ADC is used for each signal path because the downconverted baseband signals occupy the same position as each other with respect to a frequency axis in the FMCW MIMO structure as shown in FIG. 2.

Meanwhile, in order to increase an angular resolution which is one of most important figure of merits of the radar and is an advantageous attribute of the FMCW MIMO radar, it is desirable to increase the number of the antenna elements disposed in the radar apparatus. However, the increase in the number of the antenna elements results in the increase in the number of the receive RF paths. Since the plurality of the transmit and receive RF units, the frequency downconverters, and the ADCs are mounted on a single integrated circuit (IC) chip in a typical FMCW MIMO radar, the increase in the number of the ADCs brings about an increase in the IC chip area and in the interconnection complexity in the IC chip, and a synchronization problem between the ADCs in proportion to the number of the ADCs.

SUMMARY

Provided Exemplary embodiments provide a radar apparatus which has a plurality of antenna elements and enables to reduce a number of ADCs, e.g. to one, as long as being allowable according to a bandwidth of the ADC, reduce a chip area occupied by the ADC and interconnections in an integrated circuit, and prevent a synchronization problem between the ADCs by sampling receive signals of multiple channels at once.

Exemplary embodiments provide a signal processing method for detecting a target by using signals received through a plurality of antennas in the radar apparatus.

In a radar apparatus according to exemplary embodiments, frequencies of local oscillation signals used for downconverting receive signals are set to be different from each other by an amount of an offset frequency, so that each of band-limited receive signals obtained through respective RF paths may occupy a different position on a frequency axis of a frequency domain. Downconverted receive signals are combined into a single signal and converted into a single digital signal stream, and a signal processing of the digital signal stream in a digital domain enables to obtain target data.

The offset frequency may be set to be equal to a bandwidth of a beat signal of the radar apparatus. The bandwidth of the beat signal may be represent a maximum bandwidth of the beat signal expected in the radar apparatus. Alternatively, the offset frequency may be set to be greater than the bandwidth of the beat signal.

According to an aspect of exemplary embodiment, a radar apparatus includes: a transmit circuit configured to generate a RF transmit signal based on a local oscillation signal and comprising a transmit antenna radiating a transmit electromagnetic signal corresponding to the RF transmit signal; a receive circuit configured to detect, through a plurality of antennas, receive electromagnetic signals that the transmit electromagnetic signal was reflected by a target and propagated toward the radar apparatus and amplify detected signals to acquire n-tuple RF receive signals (where n is a natural number greater than or equal to 2); a frequency downconverter configured to convert each of the RF receive signals into an in-phase (I)-channel IF signal and a quadrature (Q)-channel IF signal such that frequency bands of 2n IF signals for the RF receive signals are sequentially displaced by a predetermined offset frequency; an analog-to-digital converter configured to perform an analog-to-digital conversion of a single IF signal into which the 2n IF signals are combined to generate a single digital signal stream; and a digital signal processor configured to processes the digital signal stream to extract target information.

The frequency downconverter may be configured to convert a frequency band of each RF receive signal into a first IF band to generate the I-channel IF signal, and shift a phase of the RF receive signal by 90 degrees and convert a frequency band of a phase-shifted RF receive signal into a second IF band different from the first IF band to generate the Q-channel IF signal.

The frequency downconverter may be configured to convert the RF receive signals into the 2n IF signals such that 2n IF bands of the 2n IF signals are sequentially displaced in a frequency domain by a predetermined offset frequency.

The offset frequency may be set to be equal to a signal bandwidth of a beat frequency of the radar apparatus.

The offset frequency may be set to be greater than a signal bandwidth of a beat frequency of the radar apparatus.

The receive circuit may include the plurality of antennas each configured to detect one of the electromagnetic signals and convert a detected electromagnetic signal into an electrical signal to output one of the RF receive signals and a plurality of low noise amplifiers each configured to amplify a corresponding one of the RF receive signals.

The frequency downconverter may include: a multiple-frequency local oscillation signal generator configured to generate (2n−1) adjusted oscillation signals having frequencies sequentially added with the offset frequency from a base frequency of the local oscillation signal and output 2n oscillation signals including the local oscillation signal and the adjusted oscillation signals, wherein the 2n oscillation signals comprises n-tuple oscillation signal pairs of two oscillation signals being out of phase by 90 degrees from each other; and a frequency conversion circuit configured to mix each of the RF receive signals with two oscillation signals of a corresponding oscillation signal pair among the 2n oscillation signals to generate the 2n IF signals.

The frequency downconverter may include: a first frequency converter configured to mix each of the RF receive signals with the local oscillation signal and a phase-shifted local oscillation signal whose phase is shifted by 90 degrees from the local oscillation signal to generate 2n common IF band signals; a multiple-frequency local oscillation signal generator configured to generate (2n−1) offset oscillation signals having frequencies sequentially added with the offset frequency from the offset frequency; and a second frequency converter configured to mix each of a second and subsequent common IF band signals among the 2n common IF band signals with the (2n−1) offset oscillation signals, respectively, to generate the 2n IF signals including a first common IF band signal.

According to an aspect of exemplary embodiment, a signal processing method in a radar apparatus includes: detecting, by a plurality of antennas, electromagnetic signals that a transmit electromagnetic signal was reflected by a target and propagated toward the radar apparatus and amplifying detected signals to acquire n-tuple RF receive signals (where n is a natural number greater than or equal to 2); converting each of the RF receive signals into an in-phase (I)-channel IF signal and a quadrature (Q)-channel IF signal such that frequency bands of 2n IF signals for the RF receive signals are different from each other; combining the 2n IF signals to obtain a single IF signal and performing an analog-to-digital conversion of the single IF signal to generate a single digital signal stream; and processing the digital signal stream to extract target information.

The operation of converting each of the RF receive signals into the I-channel IF signal and the Q-channel IF signal may include: converting a frequency band of each RF receive signal into a first IF band to generate the I-channel IF signal; and shifting a phase of the RF receive signal by 90 degrees and converting a frequency band of a phase-shifted RF receive signal into a second IF band different from the first IF band to generate the Q-channel IF signal.

The RF receive signals may be converted into the 2n IF signals such that 2n IF bands of the 2n IF signals are sequentially displaced in a frequency domain by a predetermined offset frequency.

The offset frequency may be set to be equal to a signal bandwidth of a beat frequency of the radar apparatus.

4

The offset frequency may be set to be greater than a signal bandwidth of a beat frequency of the radar apparatus.

The operation of converting each of the RF receive signals into the I-channel IF signal and the Q-channel IF signal may include: generating 2n oscillation signals including the local oscillation signal used for generating the transmit electromagnetic signal and (2n−1) adjusted oscillation signals having frequencies sequentially added with the offset frequency from a base frequency of the local oscillation signal, wherein the 2n oscillation signals comprises n-tuple oscillation signal pairs of two oscillation signals being out of phase by 90 degrees from each other; and mixing each of the RF receive signals with two oscillation signals of a corresponding oscillation signal pair among the 2n oscillation signals to generate the 2n IF signals.

The operation of converting each of the RF receive signals into the I-channel IF signal and the Q-channel IF signal may include: mixing each of the RF receive signals with the local oscillation signal used for generating the transmit electromagnetic signal and a phase-shifted local oscillation signal whose phase is shifted by 90 degrees from the local oscillation signal to generate 2n common IF band signals; converting the 2n common IF band signals into the 2n IF signals in respective IF bands sequentially displaced by the offset frequency. The operation of converting the 2n common IF band signals into the 2n IF signals may include: generating (2n−1) offset oscillation signals having frequencies sequentially added with the offset frequency from the offset frequency; and mixing each of a second and subsequent common IF band signals among the 2n common IF band signals with the (2n−1) offset oscillation signals, respectively, to generate the 2n IF signals including a first common IF band signal.

According to an exemplary embodiment, the frequency of each local oscillation signal being used for the downconversion of each band-limited receive signal is set differently for each receive signal. The downconverted receive signals are combined into a single signal to be converted digitally using a single or a few ADCs, and each signal may be separated through a signal processing in a digital domain to provide digitally converted receive signal data.

The exemplary embodiment enables to reduce the number of the ADCs, e.g. to one, as long as being allowable according to the bandwidth of the ADC. Thus, the exemplary embodiment allows to reduce the chip area occupied by the ADC and the interconnections in the IC and prevent the synchronization problem between the ADCs by sampling the receive signals of multiple channels at once.

BRIEF DESCRIPTION OF THE DRAWINGS

In order that the disclosure may be well understood, there will now be described various forms thereof, given by way of example, reference being made to the accompanying drawings, in which:

FIG. 5 is a detailed block diagram of a frequency down-converter shown in FIG. 4;

Figure 1:
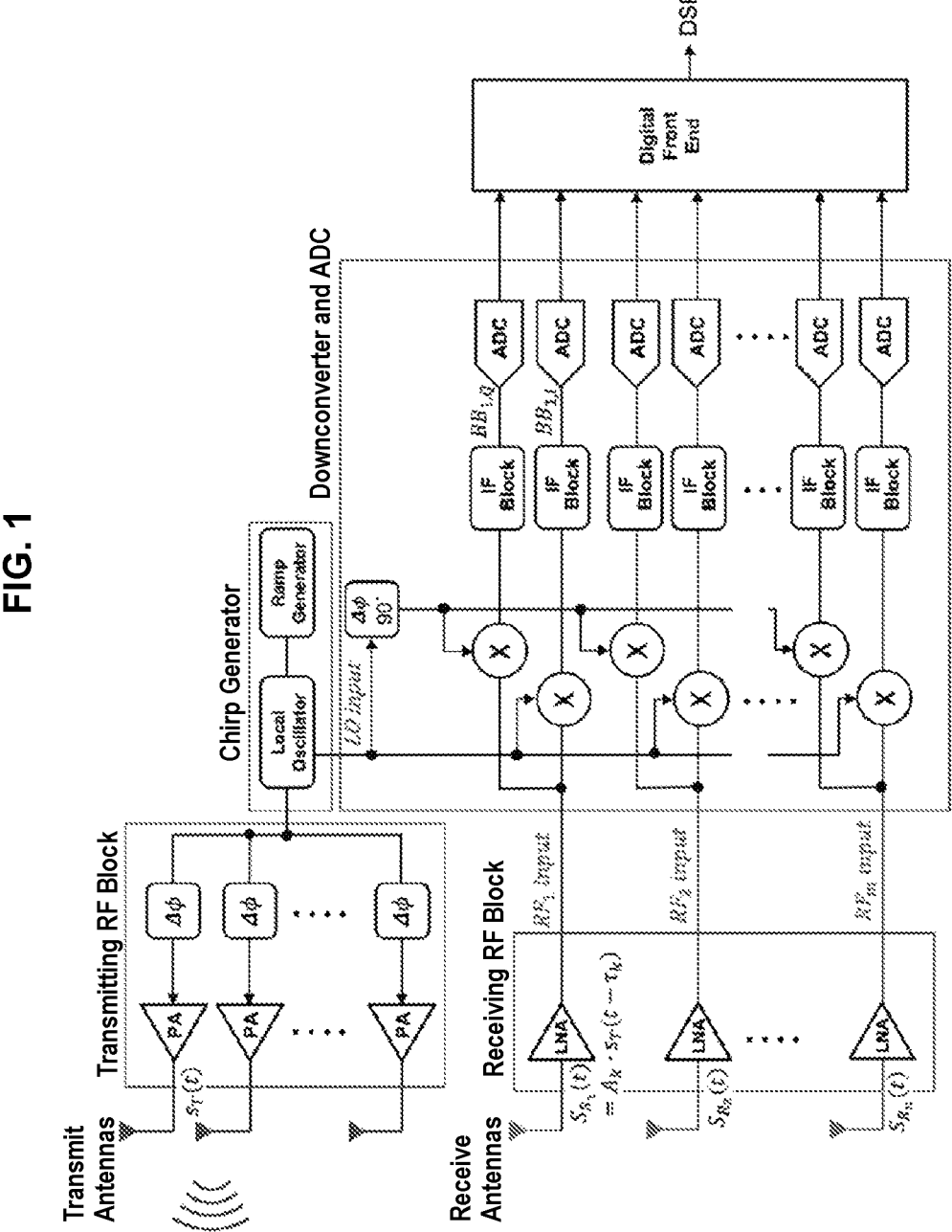
FIG. 1 is a block diagram of a conventional frequency-modulated continuous-wave (FMCW) multiple input multiple output (MIMO) radar apparatus using an FMCW signal.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises." "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

Figure 3:
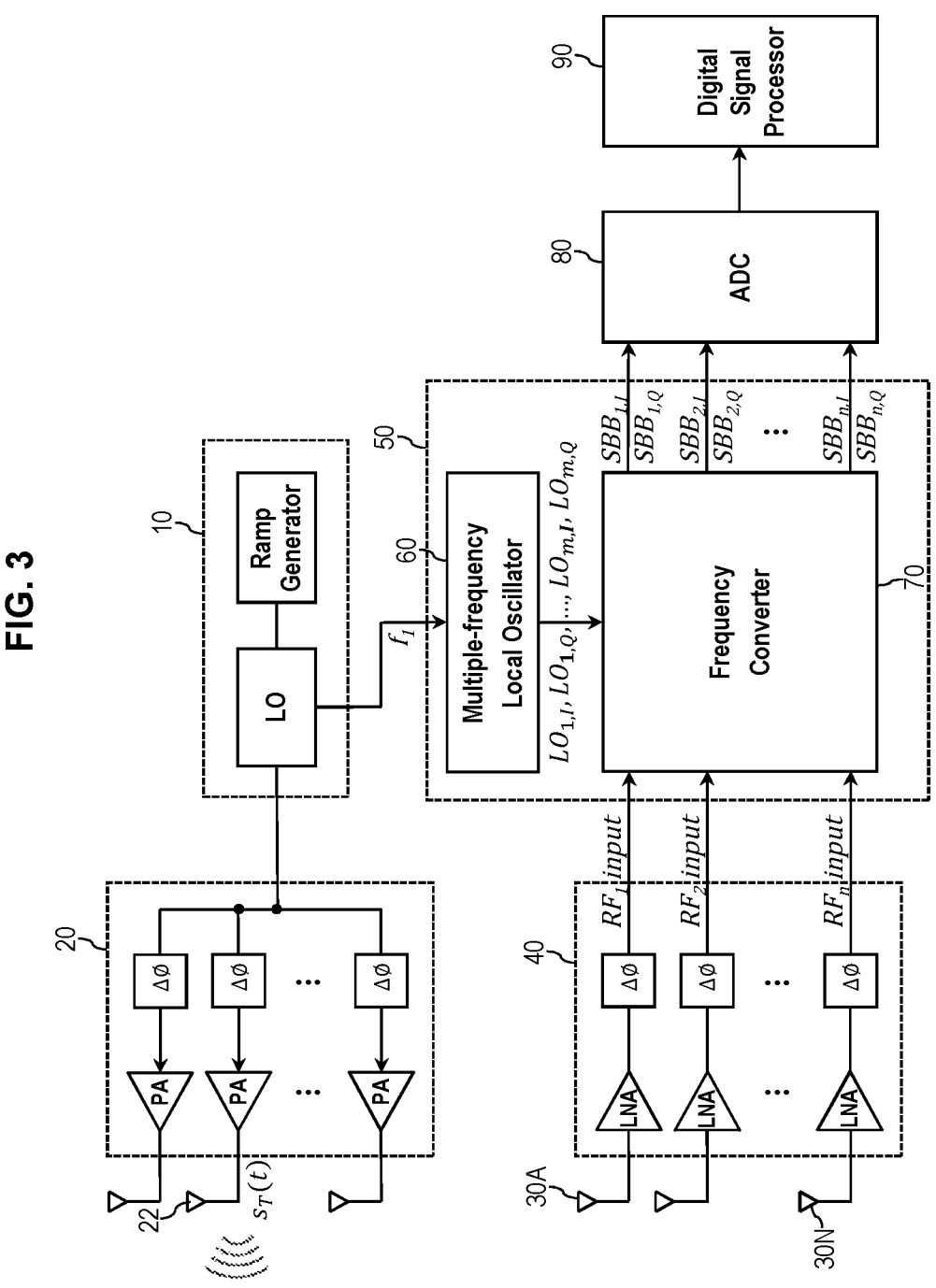
FIG. 3 is a block diagram of a radar apparatus according to an exemplary embodiment.

FIG. 3 is a block diagram of a radar apparatus according to an exemplary embodiment. The radar apparatus may be a frequency-modulated continuous-wave (FMCW) multiple input multiple output (MIMO) radar apparatus using a MIMO antenna to acquire reflected signals having propagated through multiple paths, and may include a chirp signal generator 10, a transmit RF circuit 20, transmit array antennas 22, receive array antennas 30A-30N, a receive RF circuit 40, a frequency downconverter 50, an analog-to-digital converter (ADC) 80, a digital signal processor 90.

The chirp signal generator 10 may include a ramp signal generator 12 generating a ramp signal and a local oscillator 14 generating a local oscillation (LO) signal based on the ramp signal to output as a chirp signal. The transmit RF circuit 20 may include a plurality of phase shifters and a plurality of power amplifiers provided correspondingly to the phase shifters. The phase shifters correct phase differences among transmission paths so that transmit signals are radiated from the transmit array antennas with the same phase. The power amplifiers amplify phase-corrected signals to generate amplified RF transmit signals $S_T(t)$. The transmit array antennas 22 radiate the amplified RF transmit signals as transmit radio signals.

Figure 4:
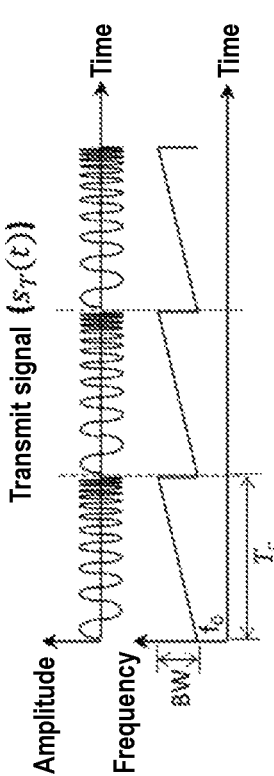
FIG. 4 illustrates an example of a waveform of an RF transmit signal.

Accordingly, the chirp signal generator 10, the transmit RF circuit 20, and the transmit antennas 22 constitute a transmission circuit that generates the chirp signal, generates the RF transmit signals based on the chirp signal, and radiates the transmit radio signals corresponding to the RF transmit signals. The ramp signal generated by the ramp signal generator 12 has a waveform that its amplitude increases over time at regular intervals. The local oscillation signal or the chirp signal has a frequency determined by the amplitude of the ramp signal. Therefore, the frequency of the local oscillation signal or the chirp signal gradually increases at regular intervals. Accordingly, the RF transmit signal $S_T(t)$ has a waveform that the frequency gradually increases over time at regular intervals similar to the local oscillation signal or the chirp signal as shown in FIG. 4.

Each of the receive array antennas 30A-30N has a certain operating frequency band and a receiving beam pattern and detects radio signals in the operating frequency band to convert into an electrical signal. The radio signals received by the receive array antennas 30A-30N include reflected signals that the transmit radio signal was reflected from a target and/or one or more another reflectors and propagated to the array antennas as well as noises. In the following description and claims, the signals detected by the receive array antennas 30A-30N after the reflection of the transmit radio signal from the target are referred to as "receive radio signals", and the signals converted into the electrical signals by the receive array antennas 30A-30N are referred to as "receive signals" $S_{R1}(t)$-$S_{Rn}(t)$. Each of the receive signals $S_{R1}(t)$-$S_{Rn}(t)$ may be modeled as a signal whose amplitude is attenuated and delayed in time, from the RF transmit signal $S_T(t)$, in proportion to a distance to the target, c.g., $S_{R1}(t)$=$A_k S_T(t-\tau_k)$. The number of the receive array antennas 30A-30N may be the same or different from the number of the transmit array antennas 22. The receive RF circuit 40 may include a first through N-th low noise amplifiers provided correspondingly to the receive array antennas 30A-30N. The low noise amplifiers amplify the receive signals $S_{R1}(t)$-$S_{Rn}(t)$ detected by the receive array antennas 30A-30N to output RF receive signals $RF_{1,input}$-$RF_{n,input}$.

The frequency downconverter 50 converts frequency bands of the RF receive signals $RF_{1,input}$-$RF_{n,input}$ into respective intermediate frequency (IF) bands which are different from each other. In particular, the frequency down-converter 50 converts each of the RF receive signals $RF_{1,input}$-$RF_{n,input}$ into two IF bands by converting the RF receive signal into an in-phase (I)-channel IF band as well as shifting the phase of the RF receive signal by 90 degrees and converting the phase-shifted RF receive signal into a quadra-ture-phase (Q)-channel IF band which is different from the I-channel IF band. As each of the RF receive signals $RF_{1,input}$-$RF_{n,input}$ are converted into two IF bands and n-tuple RF receive signals $RF_{1,input}$-$RF_{n,input}$ are converted into respective IF bands different from each other, the frequency downconverter 50 converts the n-tuple RF receive signals $RF_{1,input}$-$RF_{n,input}$ into 2n IF bands different from each other and outputs 2n IF signals. Here, the 2n IF bands are sequentially displaced in a frequency domain by a certain offset frequency $\Delta f$.

In an exemplary embodiment, the frequency downcon-verter 50 may include a multiple-frequency local oscillation (LO) signal generator 60 and a frequency converter 70. The multiple-frequency LO signal generator 60 receives a base LO signal from the chirp signal generator 10 and outputs the base LO signal as a first LO signal $LO_{1,I}$. Further, the multiple-frequency LO signal generator 60 generates (2n−1) adjusted LO signals $LO_{1,Q}$-$LO_{n,Q}$ having frequencies sequentially added with the offset frequency $\Delta f$ from a base frequency $f_1$ of the base LO signal. For each LO signal pair consisting of two consecutive LO signals among 2n LO signals $LO_{1,I}$-$LO_{n,Q}$, phases of the LO signals are set such that the phase of the LO signal $LO_{j,I}$ (where $1 \le j \le n$) at an even-numbered sequence is out of phase by 90 degrees from the phase of the LO signal $LO_{j,Q}$ at an odd-numbered sequence. The multiple-frequency LO signal generator 60 may output the 2n LO signals $LO_{1,I}$-$LO_{n,Q}$ including the base LO signal $LO_{1,I}$ and the adjusted LO signals $LO_{1,Q}$-$LO_{n,Q}$ to the frequency converter 70. The frequency con-verter 70 may generate the 2n IF signals $S_{BB_{1,I}}$-$S_{BB_{n,Q}}$ by mixing two consecutive LO signals $LO_{j,I}$ and $LO_{j,Q}$ to respective RF receive signals $RF_{j,input}$.

According to an exemplary embodiment, the 2n IF signals of different frequency bands may be combined into a single signal at an input terminal, for example, of the ADC 80. That is, the ADC 80 may generate a single digital signal stream by performing an analog-to-digital conversion with respect to a single IF signal resulted from combining the 2n IF signals. According to an exemplary embodiment, the ADC 80 dealing with the single IF signal may be implemented by a single ADC circuit. Therefore, in case where at least some of the radar apparatus of FIG. 3 is implemented by a semiconductor integrated circuit, the chip area occupied by the ADC and the interconnections may be reduced and the synchronization problem caused by multiple ADCs may be obviated. Meanwhile, the digital signal processor 90 may process the digital signal stream to extract target informa-tion. Operations performed by the digital signal processor 90 to extract the target information may include filtering, deci-mation, and other operations.

Figure 5:
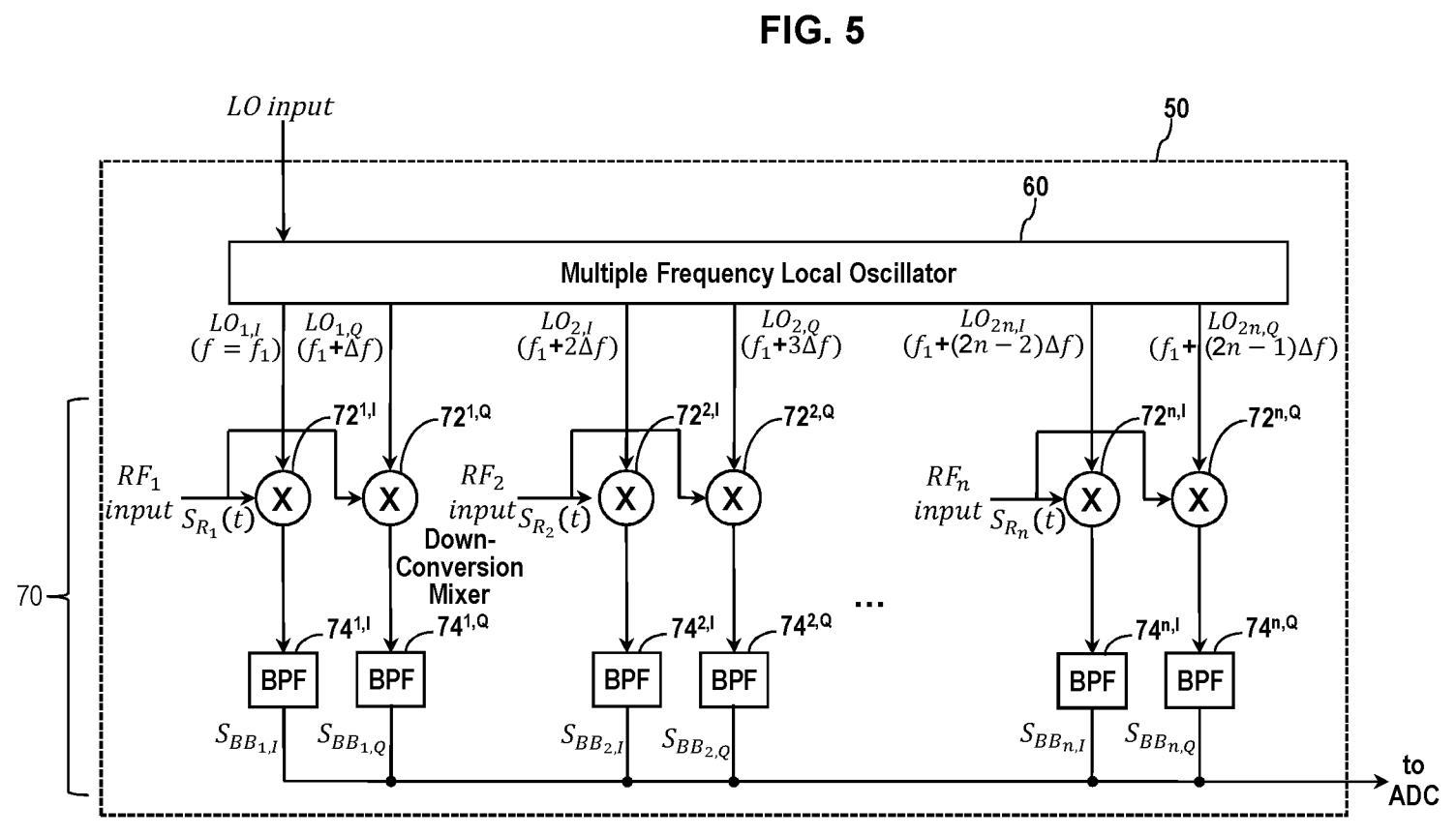

FIG. 5 is a detailed block diagram of the frequency downconverter 50 shown in FIG. 4. As mentioned above, the frequency downconverter 50 may include the multiple-frequency LO signal generator 60 and the frequency con-verter 70.

The multiple-frequency LO signal generator 60 generates the 2n LO signals including the first LO signal $LO_{1,I}$ having the same frequency as the frequency $f_1$ of the base LO signal input from the chirp signal generator 10 and the (2n−1) LO signals $LO_{1,Q}$-$LO_{n,Q}$ having the frequencies sequentially added with the offset frequency $\Delta f$ from the frequency $f_1$. That is, the frequency of the second LO signal $LO_{1,Q}$ is $f_1+\Delta f$, the frequency of the third LO signal $LO_{2,I}$ is $f_1+2\Delta f$, and the frequency of the fourth LO signal $LO_{2,Q}$ is $f_1+3\Delta f$. In this way, the frequency of the (2n−1)-th LO signal $LO_{n,I}$ is $f_1+(2n-2)\Delta f$, and the frequency of the 2n-th LO signal $LO_{n,Q}$ is $f_1+(2n-1)\Delta f$.

For each LO signal pair consisting of two consecutive LO signals among 2n LO signals $LO_{1,I}$-$LO_{n,Q}$, the LO signals are out of phase by 90 degrees from each other. That is, in a first LO signal pair consisting of the LO signals $LO_{1,I}$ and $LO_{1,Q}$, the phases of the LO signals $LO_{1,I}$ and $LO_{1,Q}$ are different from each other by 90 degrees. Also, in a second LO signal pair consisting of the LO signals $LO_{2,I}$ and $LO_{2,Q}$, the phases of the LO signals $LO_{2,I}$ and $LO_{2,Q}$ are different from each other by 90 degrees. Similarly, in an n-th LO signal pair consisting of the LO signals $LO_{n,I}$ and $LO_{n,Q}$, the phases of the LO signals $LO_{n,I}$ and $LO_{n,Q}$ are different from each other by 90 degrees.

The frequency converter 70 may include 2n mixers $72^{1,I}$-$72^{n,Q}$ and 2n bandpass filters $74^{1,I}$-$74^{n,Q}$. Each of the mixers $72^{1,I}$-$72^{n,Q}$ mixes a corresponding one of the RF receive signals $RF_{1,input}$-$RF_{n,input}$ with corresponding ones of the LO signals $LO_{1,I}$-$LO_{n,Q}$ to convert the frequency band of the corresponding RF receive signal into the IF band. For example, the mixers $72^{1,I}$ and $72^{1,Q}$ of a first mixer pair mixes a first RF receive signal $RF_{1,input}$ with the LO signals $LO_{1,I}$ and $LO_{1,Q}$ of the first LO signal pair to output an I-channel signal $S_{BB_{1,I}}$ and a Q-channel IF signal $S_{BB_{1,Q}}$ for the first RF receive signal $RF_{1,input}$, respectively. The mixers $72^{2,I}$ and $72^{2,Q}$ of a second mixer pair mixes a second RF receive signal $RF_{2,input}$ with the LO signals $LO_{2,I}$ and $LO_{2,Q}$ of the second LO signal pair to output an I-channel IF signal $S_{BB_{2,I}}$ and a Q-channel IF signal $S_{BB_{2,Q}}$ for the second RF receive signal $RF_{2,input}$, respectively. Similarly, the mixers $72^{n,I}$ and $72^{n,Q}$ of an n-th mixer pair mixes an n-th RF receive signal $RF_{n,input}$ with the LO signals $LO_{n,I}$ and $LO_{n,Q}$ of the n-th LO signal pair to output an I-channel IF signal $S_{BB_{n,I}}$ and a Q-channel IF signal $S_{BB_{n,Q}}$ for the n-th RF receive signal $RF_{n,input}$, respectively. The bandpass filters $74^{1,I}$-$74^{n,Q}$ filters the IF signals $S_{BB_{1,Q}}$-$S_{BB_{n,Q}}$ output by the mixers $72^{1,I}$-$72^{n,Q}$, respectively, to remove unnecessary signal com-ponents.

Figure 6:
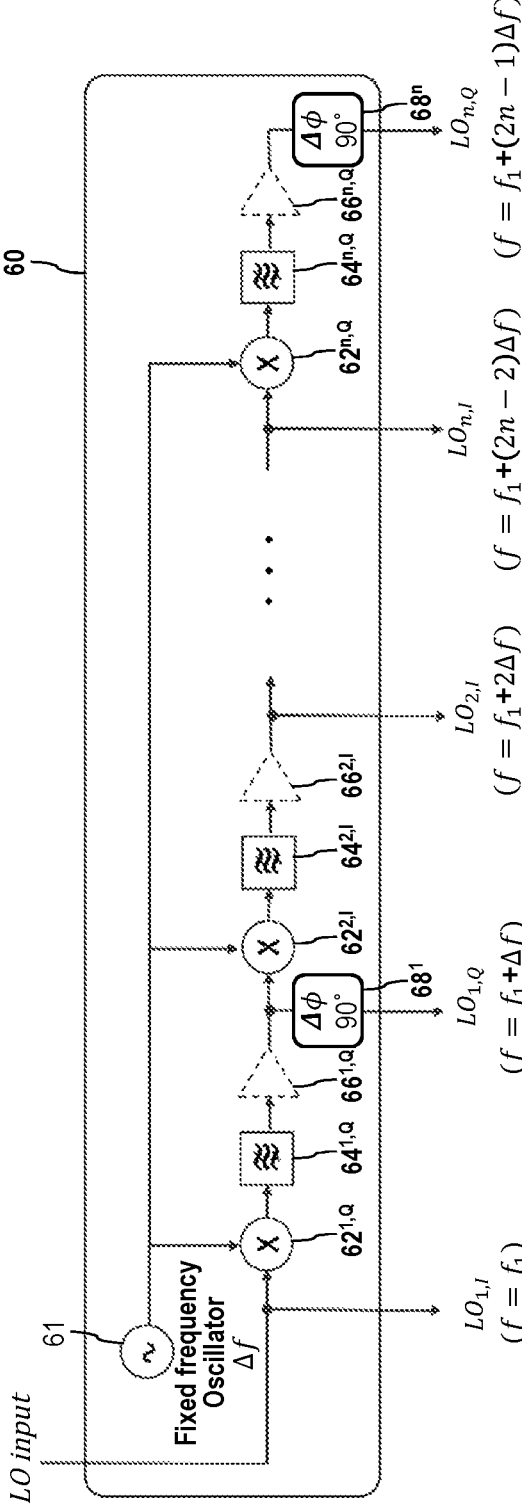
FIG. 6 is a detailed block diagram of a multiple-frequency local oscillation signal generator shown in FIGS. 3 and 5.

FIG. 6 is a detailed block diagram of a multiple-frequency LO generator 60 shown in FIGS. 3 and 5. In the embodiment illustrated in the drawing, the multiple-frequency LO signal generator 60 may include an oscillator 61, (2n−1) oscillators $62^{1,Q}$-$62^{n,Q}$. (2n−1) bandpass filters $64^{1,Q}$-$64^{n,Q}$, and n phase shifters $68^1$-$68^n$. In addition, the multiple-frequency LO signal generator 60 may include (2n−1) amplifiers $66^{1,Q}$-$66^{n,Q}$ disposed at output terminals of the bandpass filters $64^{1,Q}$-$64^{n,Q}$, respectively.

The oscillator 61 generates an offset oscillation signal having a frequency of the offset frequency $\Delta f$. The base LO signal input from the chirp signal generator 10 and having the frequency $f_1$ may be output as the first LO signal $LO_{1,I}$ of the first LO signal pair. The mixer $62^{1,Q}$ may mix the first LO signal $LO_{1,I}$ with the offset oscillation signal to shift the frequency band by the offset frequency $\Delta f$ to the IF band centered at a frequency $f_1+\Delta f$. The bandpass filter $64^{1,Q}$ bandpass-filters an output signal of the mixer $62^{1,Q}$ to remove signal components in unnecessary frequency bands. The amplifier $66^{1,Q}$ may amplify an output signal of the bandpass filter $64^{1,Q}$ to compensate for a signal attenuation in the mixer $62^{1,Q}$ and/or the bandpass filter $64^{1,Q}$. The phase shifter $68^1$ shifts the phase of an output signal of the amplifier $66^{1,Q}$ by 90 degrees to output a phase-shifted signal as the second LO signal $LO_{1,Q}$ of the first LO signal pair.

The mixer $62^{2,Q}$ may mix the first LO signal $LO_{1,Q}$ with the offset oscillation signal to shift the frequency band by the offset frequency $\Delta f$ to the IF band centered at a frequency $f_1+2\Delta f$. The bandpass filter $64^{2,I}$ bandpass-filters an output signal of the mixer $62^{2,I}$, and the amplifier $66^{2,I}$ may amplify an output signal of the bandpass filter $64^{2,I}$. An output signal of the amplifier $66^{2,I}$ may be output as a first LO signal $LO_{2,I}$ of the second LO signal pair. The mixer $62^{2,Q}$ may mix the LO signal $LO_{2,I}$ with the offset oscillation signal to shift the frequency band by the offset frequency $\Delta f$ to the IF band centered at a frequency $f_1+3\Delta f$. The bandpass filter $64^{2,Q}$ bandpass-filters an output signal of the mixer $62^{2,Q}$, and the amplifier $66^{2,Q}$ may amplify an output signal of the bandpass filter $64^{2,Q}$. The phase shifter $68^2$ shifts the phase of an output signal of the amplifier $66^{2,Q}$ by 90 degrees to output a phase-shifted signal as the second LO signal $LO_{2,Q}$ of the second LO signal pair.

In this way, each combination of a mixer, a bandpass filter, and an amplifier connected in series may generate a LO signal whose frequency is additionally increased by the offset frequency $\Delta f$ from an LO signal of a previous stage. In addition, a phase shift of 90 degrees may be performed by a phase shifter for the second LO signal, i.e. the Q-channel LO signal, of each LO signal pair. As a result, the 2n LO signals $LO_{1,I}$-$LO_{n,Q}$ may be generated by the multiple-frequency LO generator 60.

Figure 2:
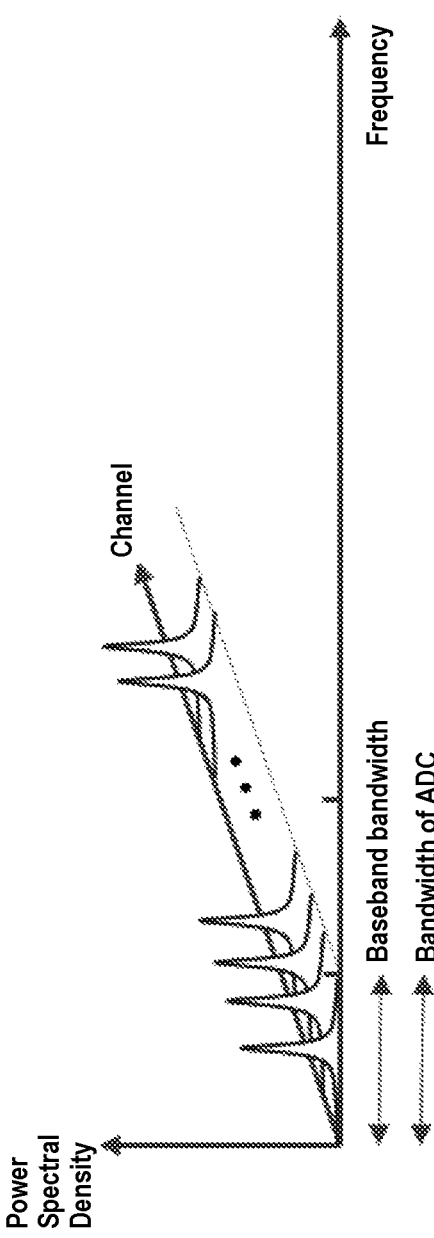
FIG. 2 illustrates a baseband bandwidth and a power spectral density of each receive channel in the FMCW MIMO radar apparatus of FIG. 1.
Figure 7:
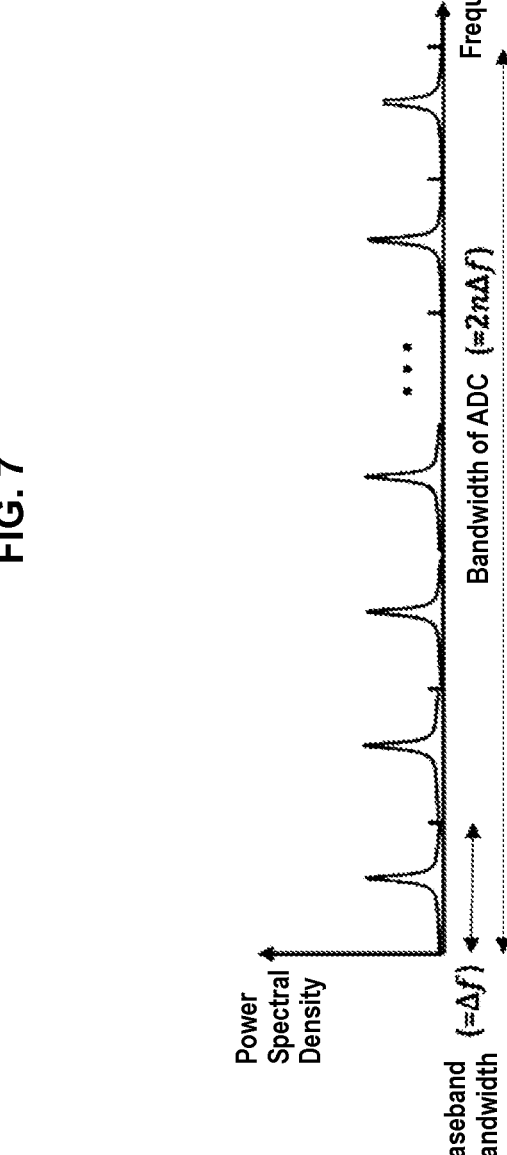
FIG. 7 is an illustration of a frequency spectrum of signals downconverted to an IF band.

FIG. 7 illustrates a frequency spectrum of the signals downconverted to the IF band. According to the present exemplary embodiment, the frequencies of the plurality of band-limited RF receive signals $RF_{1,input}$-$RF_{n,input}$ are sequentially converted to the plurality of IF bands arranged adjacently. Since the signals converted to respective IF bands do not occupy the same frequency band contrarily to the example of FIG. 2 but occupy separate positions along the frequency axis, the signals may be combined into a single IF band or baseband signal and processed properly without affecting each other. That is, the 2n IF signals in respective frequency bands may be combined into a single signal at the input terminal of the ADC 80 and converted into a single digital signal stream by a single ADC circuit.

The radar apparatus shown in FIGS. 3 through 7 operates as follows.

The chirp signal generated by the chirp signal generator 10 is phase-corrected by the transmit RF circuit 20 and radiated into free space as the transmit radio signal through the transmit array antennas 22. Though each of the transmit array antennas 22 radiates the RF transmit signal, the following description will be focused on one of the RF transmit signals $S_T(t)$ radiated through one of the antennas for convenience of explanation. The radiated transmit radio signal may be detected, after being reflected by the target, as receive radio signals by the receive array antennas 30A-30N.

Each of the receive signals $S_{R1}(t)$-$S_{Rn}(t)$ converted from receive radio signals into electrical signals by the receive array antennas 30A-30N are converted into a pair of IF signals including the I-channel signal and the Q-channel signal by the frequency downconverter 50. In particular, the frequency bands of the receive signals $S_{R1}(t)$-$S_{Rn}(t)$ may be converted to respective IF bands different from each other. As a result, the frequency bands of the n-tuple RF receive signals $RF_{1,input}$-$RF_{n,input}$ acquired by the receive array antennas 30A-30N are converted into 2n different IF bands. The 2n IF bands are sequentially displaced in the frequency domain by the offset frequency $\Delta f$. The 2n IF signals are combined into a single signal, converted into the digital bitstream by the ADC 80, and analyzed in the digital domain.

A typical FMCW radar converts the receive RF signals into baseband signals using the LO signal used for generating the transmit signal as can be seen in FIG. 1. Accordingly, IF signals or baseband signals having beat frequencies corresponding to differences in the frequencies of the transmit signal and the receive signals are input to the ADC. Generally, the FMCW radar chip is designed to be operable with the bit frequencies in a range of several tens of MHZ.

The latest ADC technologies, however, may achieve a sampling speed of several gigasamples per second (Gsps). Taking into account the difference in the actual analog-to-digital conversion speed and the feasible conversion speed, the radar apparatus according to an exemplary embodiment combines the plurality of IF signals into the single signal in which the plurality of IF signal components may be distinguished in the frequency domain, converts the combined IF signal into the digital signal by use of a single ADC having a high sampling rate, and analyzes the digital signal in the digital domain to derive target-related data.

The combined signal to be converted into the digital signal by the ADC may be regarded as a baseband signal or an IF band signal. In more detail, the combined signal may be regarded as the IF signal rather than the baseband signal in that the frequency increases periodically over time in a certain bandwidth due to the nature of the radar signal and the downconverted signal is a beat signal having a beat frequency corresponding to the frequency difference between the transmit signal and the receive signals. In particular, since the signals to be combined are sequentially displaced by the offset frequency $\Delta f$ and the combined signal includes such signal components in the frequency domain according to an exemplary embodiment, the combined signal may be regarded as the IF signal considering only the position of the frequency band. Meanwhile, the combined signal may be regarded as the baseband signal because the frequency band of the signal is no longer downconverted to a lower frequency band. Therefore, in this specification, the terms "baseband signal" and "IF band signal" or "IF signal" are used interchangeably to refer to the combined signal subject to the analog-to-digital conversion.

A number of the baseband or IF band signals that may be combined and processed by the ADC may be calculated by Equation 1 assuming that the baseband signal is sampled at twice a maximum beat frequency that corresponds to the bandwidth of the baseband signal.

with a slope $BW/T_c$ at a certain period $T_c$. The receive signal is detected when a delay time of Number of baseband signals $(N) \leq$ [Equation 1]

$$\frac{\text{Sampling rate of } ADC}{2 \times \text{maximum beat frequency}}$$

$$\tau_k = \frac{2d}{c}$$

However, since each RF receive signal is divided into the I-channel signal and the Q-channel signal before the processing in the frequency downconverter 50, the number of RF receive signals that can be processed by one ADC may be determined by Equation 2.

has elapsed after the emission of the transmit signal, where d denotes a distance from the radar apparatus to the target and c represents a propagation speed of the electromagnetic wave in free space, i.e., the speed of light. The difference between the frequency of the transmit signal and the frequency of the receive signal at any point in time becomes the beat frequency.

Number of *RF* receive signals = [Equation 2]

$$\frac{\text{Number of baseband signals}}{2}$$

The transmit signal $S_T(t)$ transmitted through one of the transmit antennas may be expressed by Equation 3.

According to an exemplary embodiment, the downconverted IF signals with regard to respective RF receiving paths are combined into the single combined IF signal before the analog-to-digital conversion by the ADC as long as each of the IF signals may be discriminated from the other IF signals without interference, that is, within the range of the number of the RF receive signals allowable by a condition expressed by the Equations 1 and 2. In case where the number of the RF signal paths is too large compared with the sampling rate in the ADC, the IF signals may be grouped into two or more groups and a separate ADC may be used for each group.

$$s_T(t) = \cos\left(2\pi f_0 t + 2\pi \frac{1}{2}\frac{BW}{T_c}t^2 + \varnothing_0(t)\right)$$ [Equation 3]

where $\varnothing_0(t)$ is an initial phase.

Meanwhile, the LO signals used for the downconversion of the receive signal for each RF path have frequencies size obtained by adding the offset frequency $\Delta f$ once or a plurality of times to the frequency $f_1$ of the base LO signal. In detail, the LO signal $LO_{m,I}(t)$ for the I-channel of the m-th path may be expressed by Equation 4.

The frequency downconversion process will now be described in more detail with reference to FIGS. 5 and 6.

Figure 8:
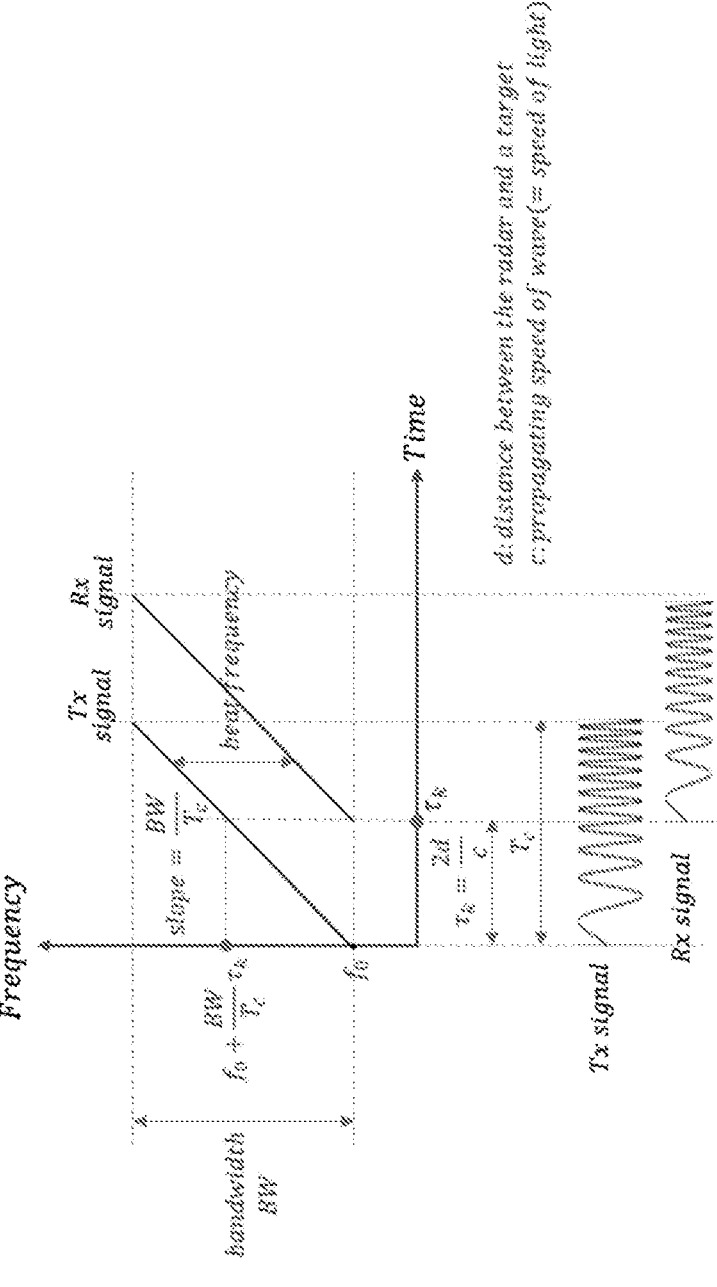
FIG. 8 is an illustration of a frequency relationship between transmit and receive signals in the FMCW MIMO radar apparatus.

FIG. 8 illustrates a frequency relationship between the transmit signal and one of the receive signals in the FMCW MIMO radar apparatus. The frequencies of the chirp signal and the RF transmit signal periodically rise from a lower limit $f_0$ to an upper limit $$LO_{m,I}(t) = \cos\left(2\pi(f_0 + m\Delta f)t + 2\pi\frac{1}{2}\frac{BW}{T_c}t^2 + \varnothing_0(t)\right)$$ [Equation 4]

The transmit signal $S_T(t)$ may be reflected at a k-th target and may be detected by an m-th receive antenna among the receive array antennas 30A-30N. An m-th RF receive signal $RF_{m,input}$ detected by the m-th receive antenna after the reflection of the transmit signal $S_T(t)$ at the k-th target may be converted by using the LO signal $LO_{m,I}(t)$. A band-converted I-channel IF signal $S_{BB_I}(t)$ may be expressed by Equation 5.

$$f_0 + \frac{BW}{T_c}$$

$$S_{BB_I}(t) = s_R(t) \cdot LO_{m,I}(t)$$ [Equation 5]

$$= A_k \cdot s_T(t - \tau_k) \cdot LO_{m,I}(t)$$

$$S_{BB_I}(t) = A_k \cdot \cos\left(2\pi f_0(t - \tau_k) + 2\pi\frac{1}{2}\frac{BW}{T_c}(t - \tau_k)^2 + \varnothing_0(t - \tau_k)\right) \cdot \cos\left(2\pi(f_0 + m\Delta f)t + 2\pi\frac{1}{2}\frac{BW}{T_c}t^2 + \varnothing_0(t)\right)$$

$$= \frac{1}{2}A_k \cdot \left\{ \begin{array}{l} \cos\left(2\pi f_0(t - \tau_k) + 2\pi\frac{1}{2}\frac{BW}{T_c}(t - \tau_k)^2 + \varnothing_0(t - \tau_k) - 2\pi(f_0 + m\Delta f)t - 2\pi\frac{1}{2}\frac{BW}{T_c}t^2 - \varnothing_0(t)\right) + \\ \cos\left(2\pi f_0(t - \tau_k) + 2\pi\frac{1}{2}\frac{BW}{T_c}(t - \tau_k)^2 + \varnothing_0(t - \tau_k) + 2\pi(f_0 + m\Delta f)t + 2\pi\frac{1}{2}\frac{BW}{T_c}t^2 + \varnothing_0(t)\right) \end{array} \right\}$$

$$= \frac{1}{2}A_k \cdot \left\{ \begin{array}{l} \cos\left(2\pi f_0 t - 2\pi f_0\tau_k + 2\pi\frac{1}{2}\frac{BW}{T_c}(t^2 - 2\tau_k t + \tau_k^2) + \varnothing_0(t - \tau_k) - 2\pi f_0 t - 2\pi m\Delta f t - 2\pi\frac{1}{2}\frac{BW}{T_c}t^2 - \varnothing_0(t)\right) + \\ \cos\left(2\pi f_0 t - 2\pi f_0\tau_k + 2\pi\frac{1}{2}\frac{BW}{T_c}(t^2 - 2\tau_k t + \tau_k^2) + \varnothing_0(t - \tau_k) + 2\pi f_0 t + 2\pi m\Delta f t + 2\pi\frac{1}{2}\frac{BW}{T_c}t^2 + \varnothing_0(t)\right) \end{array} \right\}$$

$$= \frac{1}{2}A_k \cdot \left\{ \begin{array}{l} \cos\left(2\pi f_0\tau_k + 2\pi\frac{BW}{T_c}\tau_k t - 2\pi\frac{1}{2}\frac{BW}{T_c}\tau_k^2 - \varnothing_0(t - \tau_k) + 2\pi m\Delta f t + \varnothing_0(t)\right) + \\ \cos\left(2\pi \cdot (2f_0)t - 2\pi f_0\tau_k + 2\pi\frac{BW}{T_c}t^2 - 2\pi\frac{1}{2}\frac{BW}{T_c}\tau_k^2 + \varnothing_0(t - \tau_k) + 2\pi m\Delta f t + \varnothing_0(t)\right) \end{array} \right\}$$

$$= \frac{1}{2}A_k \cdot \left\{ \begin{array}{l} \cos\left(2\pi m\Delta f t + 2\pi f_0\tau_k + 2\pi\frac{BW}{T_c}\tau_k t - 2\pi\frac{1}{2}\frac{BW}{T_c}\tau_k^2 + \varnothing_0(t) - \varnothing_0(t - \tau_k)\right) + \\ \cos\left(2\pi \cdot (2f_0 + 2\pi m\Delta f)t - 2\pi f_0\tau_k + 2\pi\frac{BW}{T_c}t^2 - 2\pi\frac{BW}{T_c}\tau_k t + 2\pi\frac{1}{2}\frac{BW}{T_c}\tau_k^2 + \varnothing_0(t) + \varnothing_0(t - \tau_k)\right) \end{array} \right\}$$

When the IF signal $S_{BB_I}(t)$ undergoes the bandpass filtering or lowpass filtering, the unnecessary signal components having the frequency of $2f_0 + 2\pi m\Delta f$ are removed and only the following baseband components remain.

$$S_{BB_I}(t) = \frac{1}{2}A_k \cdot \cos\left(2\pi m\Delta ft + 2\pi\frac{BW}{T_c}\tau_k t + 2\pi f_0\tau_k - 2\pi\frac{1}{2}\frac{BW}{T_c}\tau_k^2 + \phi_0(t) - \phi_0(t - \tau_k)\right)$$

$$= \frac{1}{2}A_k \cdot \cos\left(2\pi\left(m\Delta f + \frac{BW}{T_c}\tau_k\right)t + \left(2\pi f_0\tau_k - 2\pi\frac{1}{2}\frac{BW}{T_c}\tau_k^2\right) + \phi_0(t) - \phi_0(t - \tau_k)\right)$$

[Equation 6]

As can be seen in the above equation, when a signal with a frequency of $(f_1 + m\Delta f)$ is used as a local oscillation signal for the frequency conversion, the frequency band of the baseband or IF band signal is changed on the frequency axis by an amount of $m\Delta f$. Thus, if the frequency of the LO signal used for the frequency conversion for each path is different from the frequency for the previous path by $\Delta f$, the position of the frequency band occupied by each IF signal is changed so that the signals can be combined on the frequency axis without changing other parameters.

Meanwhile, the m-th RF receive signal $RF_{m,input}$ detected by the m-th receive antenna after the reflection of the transmit signal $S_T(t)$ at the k-th target may also be converted by using the LO signal $LO_{m,Q}(t)$. The LO signal $LO_{m,Q}(t)$ for the Q-channel of the m-th path may be expressed by Equation 7. A band-converted Q-channel IF signal $S_{BB_Q}(t)$ may be expressed by Equation 8.

$$LO_{M,Q}(t) = \sin\left(2\pi(f_0 + m\Delta f)t + 2\pi\frac{1}{2}\frac{BW}{T_c}t^2 + \phi_0(t)\right)$$

[Equation 7]

$$S_{BB_Q}(t) = s_R(t) \cdot LO_{m,Q}(t)$$

[Equation 8]

$$= A_k \cdot s_T(t - \tau_k) \cdot LO_{m,Q}(t)$$

$$S_{BB_Q}(t) = A_k \cdot \cos\left(2\pi f_0(t - \tau_k) + 2\pi\frac{1}{2}\frac{BW}{T_c}(t - \tau_k)^2 + \phi_0(t - \tau_k)\right) \cdot \sin\left(2\pi(f_0 + m\Delta f)t + 2\pi\frac{1}{2}\frac{BW}{T_c}t^2 + \phi_0(t)\right)$$

$$= \frac{1}{2}A_k \cdot \left\{\begin{array}{l} \sin\left(2\pi f_0(t - \tau_k) + 2\pi\frac{1}{2}\frac{BW}{T_c}(t - \tau_k)^2 + \phi_0(t - \tau_k) + 2\pi(f_0 + m\Delta f)t + 2\pi\frac{1}{2}\frac{BW}{T_c}t^2 + \phi_0(t)\right) - \\ \sin\left(2\pi f_0(t - \tau_k) + 2\pi\frac{1}{2}\frac{BW}{T_c}(t - \tau_k)^2 + \phi_0(t - \tau_k) - 2\pi(f_0 + m\Delta f)t - 2\pi\frac{1}{2}\frac{BW}{T_c}t^2 - \phi_0(t)\right) \end{array}\right\}$$

$$= \frac{1}{2}A_k \cdot \left\{\begin{array}{l} \sin\left(2\pi f_0 t - 2\pi f_0\tau_k + 2\pi\frac{1}{2}\frac{BW}{T_c}(t^2 - 2\tau_k t + \tau_k^2) + \phi_0(t - \tau_k) + 2\pi f_0 t + 2\pi m\Delta ft + 2\pi\frac{1}{2}\frac{BW}{T_c}t^2 + \phi_0(t)\right) - \\ \sin\left(2\pi f_0 t - 2\pi f_0\tau_k + 2\pi\frac{1}{2}\frac{BW}{T_c}(t^2 - 2\tau_k t + \tau_k^2) + \phi_0(t - \tau_k) - 2\pi f_0 t - 2\pi m\Delta ft - 2\pi\frac{1}{2}\frac{BW}{T_c}t^2 - \phi_0(t)\right) \end{array}\right\}$$

$$= \frac{1}{2}A_k \cdot \left\{\begin{array}{l} \sin\left(2\pi(2f_0)t - 2\pi f_0\tau_k + 2\pi\frac{BW}{T_c}t^2 - 2\pi\frac{BW}{T_c}\tau_k t + 2\pi\frac{1}{2}\frac{BW}{T_c}\tau_k^2 + \phi_0(t - \tau_k) + 2\pi m\Delta ft + \phi_0(t)\right) - \\ \sin\left(-2\pi f_0\tau_k - 2\pi\frac{BW}{T_c}\tau_k t + 2\pi\frac{1}{2}\frac{BW}{T_c}\tau_k^2 + \phi_0(t - \tau_k) - 2\pi m\Delta ft - \phi_0(t)\right) \end{array}\right\}$$

$$= \frac{1}{2}A_k \cdot \left\{\begin{array}{l} \sin\left(2\pi(2f_0 + 2\pi m\Delta ft)t - 2\pi f_0\tau_k + 2\pi\frac{BW}{T_c}t^2 - 2\pi\frac{BW}{T_c}\tau_k t + 2\pi\frac{1}{2}\frac{BW}{T_c}\tau_k^2 + \phi_0(t) + \phi_0(t - \tau_k)\right) + \\ \sin(2\pi m\Delta f)t + 2\pi f_0\tau_k + 2\pi\frac{BW}{T_c}\tau_k t - 2\pi\frac{1}{2}\frac{BW}{T_c}\tau_k^2 + \phi_0(t) - \phi_0(t - \tau_k)) \end{array}\right\}$$

When the IF signal $S_{BB_Q}(t)$ undergoes the bandpass filtering or lowpass filtering, the unnecessary signal components having the frequency of $2f_0 + 2\pi m\Delta f$ are removed and only the following baseband components remain.

$$S_{BB_Q}(t) = \frac{1}{2}A_k \cdot \sin\left(2\pi(m\Delta f)t + 2\pi f_0\tau_k + 2\pi\frac{BW}{T_c}\tau_k t - 2\pi\frac{1}{2}\frac{BW}{T_c}\tau_k^2 + \phi_0(t) - \phi_0(t - \tau_k)\right)$$

$$= \frac{1}{2}A_k \cdot \sin\left(2\pi\left(m\Delta f + \frac{BW}{T_c}\tau_k\right)t + \left(2\pi f_0\tau_k - 2\pi\frac{1}{2}\frac{BW}{T_c}\tau_k^2\right) + \phi_0(t) - \phi_0(t - \tau_k)\right)$$

[Equation 9]

As can be seen in the above equation, when a signal with a frequency of $(f_1 + m\Delta f)$ is used as a local oscillation signal for the frequency conversion, the frequency band of the baseband or IF band signal is changed also for the Q-channel on the frequency axis by an amount of $m\Delta f$. Thus, if the frequency of the LO signal used for the frequency conversion for each channel is different from the frequency for the previous channel by $\Delta f$, the position of the frequency band occupied by each IF signal is changed so that the signals can be combined on the frequency axis without changing other parameters.

Figure 9:
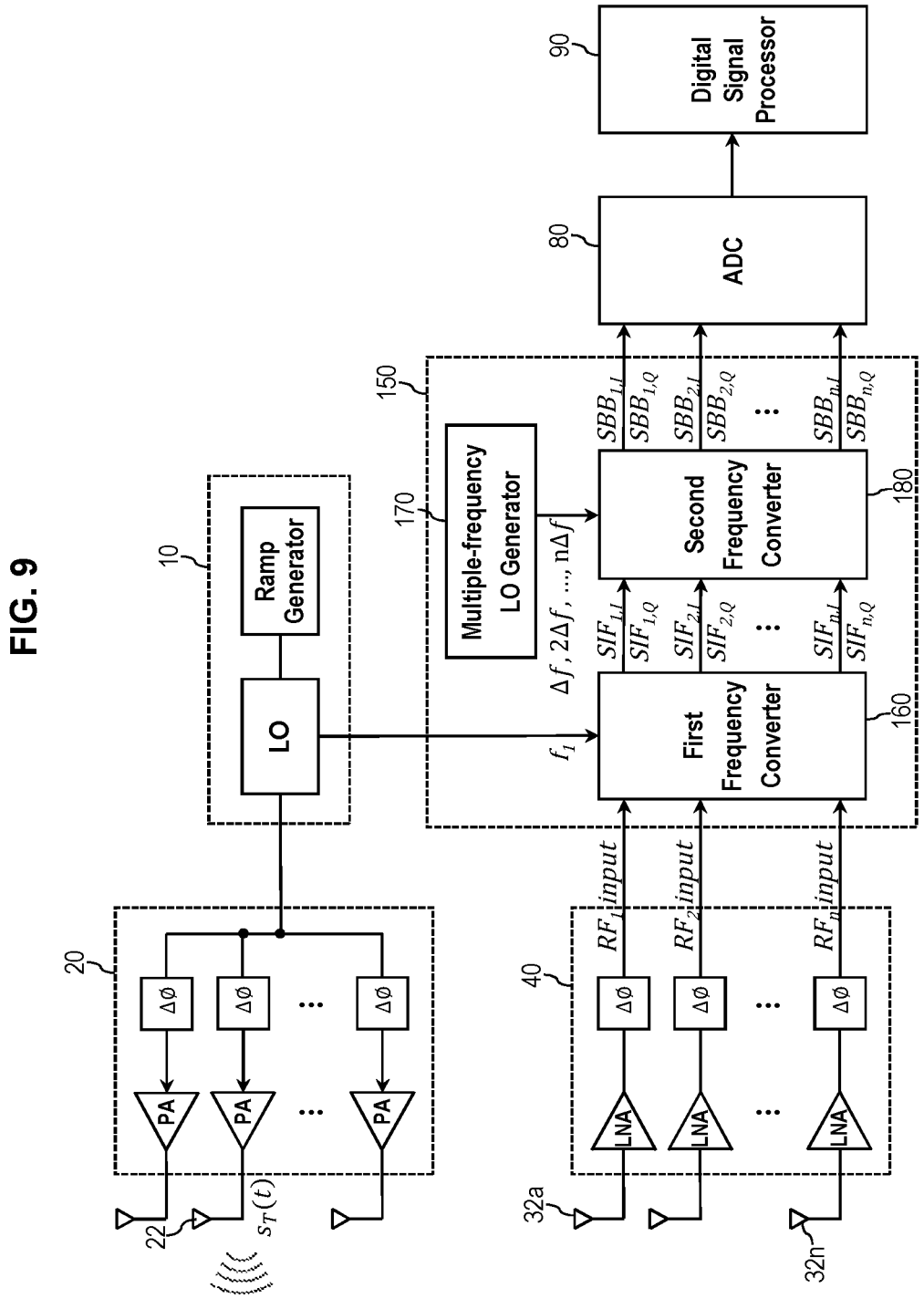
FIG. 9 is a block diagram of a radar apparatus according to another exemplary embodiment.

FIG. 9 is a block diagram of the radar apparatus according to another exemplary embodiment. According to this embodiment, a plurality of RF receive signals are first converted to a same IF band and then converted to respective IF bands different from each other unlike the embodiment shown in FIG. 3 where a plurality of RF receive signals are directly converted to a plurality of IF bands. The radar apparatus may include the chirp signal generator 10, the transmit RF circuit 20, the transmit array antennas 22, the receive array antennas 30A-30N, the receive RF circuit 40, a frequency downconverter 150, the ADC 80, and the digital signal processor 90. The components shown in FIG. 9 except for the frequency downconverter 150 are similar to the components shown in FIG. 3, and thus the detailed descriptions thereof will be omitted for simplicity.

The frequency downconverter 150 converts the frequency bands of the RF receive signals $RF_{1,input}$-$RF_{n,input}$ into respective IF bands which are different from each other. In particular, the frequency downconverter 50 converts each of the RF receive signals $RF_{1,input}$-$RF_{n,input}$ into two IF bands by converting the RF receive signal into the I-channel IF band as well as shifting the phase of the RF receive signal by 90 degrees and converting the phase-shifted RF receive signal into the Q-channel IF band which is different from the I-channel IF band. As each of the RF receive signals $RF_{1,input}$-$RF_{n,input}$ are converted into two IF bands and n-tuple RF receive signals $RF_{1,input}$-$RF_{n,input}$ are converted into respective IF bands different from each other, the frequency downconverter 50 converts the n-tuple RF receive signals $RF_{1,input}$-$RF_{n,input}$ into 2n IF bands different from each other and outputs 2n IF signals. Here, the 2n IF bands are sequentially displaced in a frequency domain by a certain offset frequency $\Delta f$.

In the embodiment of FIG. 9, the frequency downconverter 150 may include a first frequency converter 160, a multiple-frequency LO signal generator 170, and a second frequency converter 180. The first frequency converter 160 mixes an LO signal $LO_I$ and a phase-shifted LO signal $LO_Q$ of which phase is shifted by 90 degrees from the LO signal $LO_I$ to the n-tuple RF receive signals $RF_{1,input}$-$RF_{n,input}$ to generate 2n common IF band signals $S_{BB_{1,I}}$-$S_{BB_{n,Q}}$. Accordingly, the 2n common IF band signals $S_{BB_{1,I}}$-$S_{BB_{n,Q}}$ generated from the plurality of RF receive signals $RF_{1,input}$-$RF_{n,input}$ are in the same IF band. The multiple-frequency LO signal generator 170 generates (2n−1) offset oscillation signals having frequencies sequentially added with the offset frequency $\Delta f$ from the offset frequency $\Delta f$. The second frequency converter 180 outputs a first common IF band signal $S_{IF_{1,I}}$ among the 2n common IF band signals $S_{IF_{1,I}}$-$S_{IF_{n,Q}}$ from the first frequency converter 160 as is, and mixes the (2n−1) offset oscillation signals to the remaining common IF band signals $S_{IF_{1,Q}}$-$S_{IF_{n,Q}}$, respectively, to generate (2n−1) IF signals $S_{BB_{1,I}}$-$S_{BB_{n,Q}}$. Accordingly, the 2n common IF band signals $S_{IF_{1,I}}$-$S_{IF_{n,Q}}$ in the common IF band are converted into IF signals $S_{BB_{1,I}}$-$S_{BB_{n,Q}}$ of different bands.

Figure 10:
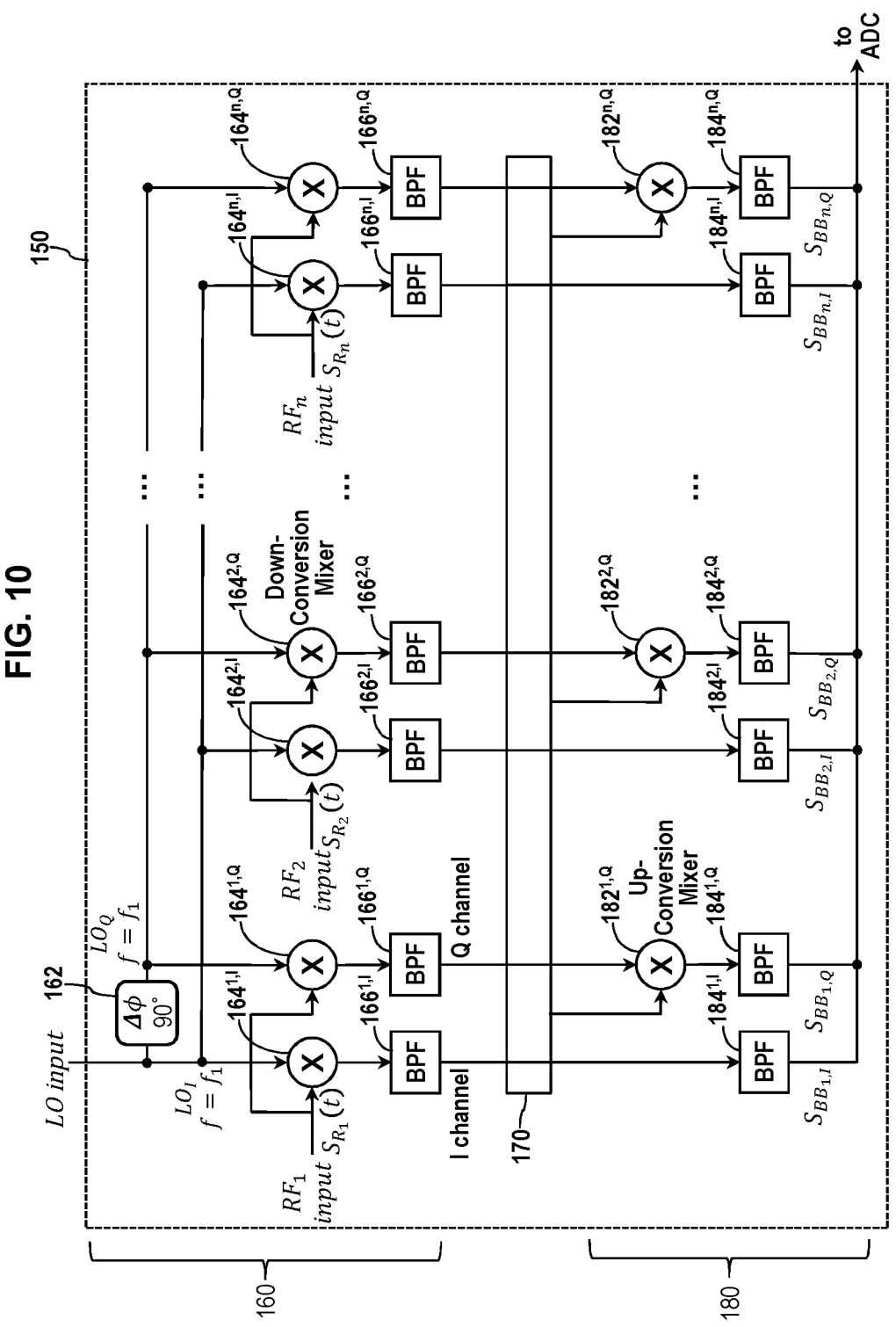
FIG. 10 is a detailed block diagram of a frequency downconverter shown in FIG. 9.

FIG. 10 is a detailed block diagram of the frequency downconverter 150 shown in FIG. 9.

The first frequency converter 160 may include a phase shifter 162, 2n mixers $162^{1,I}$-$164^{n,Q}$, and 2n bandpass filters $166^{1,I}$-$166^{n,Q}$. The phase shifter 162 shifts the phase of the LO signal $LO_I$ from the chirp signal generator 10 of a transmission circuit by 90 degrees to generate the phase-shifted LO signal $LO_Q$. Each of the mixers $162^{1,I}$-$164^{n,Q}$ mixes one of the RF receive signals $RF_{1,input}$-$RF_{n,input}$ with either the LO signal $LO_I$ or the phase-shifted LO signal $LO_Q$ to generate the common IF band signals $S_{IF_{1,I}}$-$S_{IF_{n,Q}}$. Among the mixers $162^{1,I}$-$164^{n,Q}$, every two mixers form a pair and the same RF receive signal, so that one mixer of the pair mixes the RF receive signal with the LO signal $LO_I$ while the other mixer of the pair mixes the RF receive signal with the phase-shifted LO signal $LO_Q$. The LO signal $LO_I$ and the phase-shifted LO signal $LO_Q$ are alternately applied to the mixers $162^{1,I}$-$164^{n,Q}$.

For example, the mixer $164^{1,I}$ mixes the RF receive signal $RF_{1,input}$ with the LO signal $LO_I$ to generate the common IF band signal $SIF_{1,I}$, and the mixer $164^{1,Q}$ mixes the RF receive signal $RF_{1,input}$ with the phase-shifted LO signal $LO_Q$ to generate the common IF band signal $S_{IF_{1,Q}}$. The mixer $164^{2,I}$ mixes the RF receive signal $RF_{2,input}$ with the LO signal $LO_I$ to generate the common IF band signal $S_{IF_{2,I}}$, and the mixer $164^{2,Q}$ mixes the RF receive signal $RF_{2,input}$ with the phase-shifted LO signal $LO_Q$ to generate the common IF band signal $S_{IF_{2,Q}}$. In this way, mixer $164^{n,I}$ mixes the RF receive signal $RF_{n,input}$ with the LO signal $LO_I$ to generate the common IF band signal $S_{IF_{n,I}}$, and the mixer $164^{n,Q}$ mixes the RF receive signal $RF_{n,input}$ with the phase-shifted LO signal $LO_Q$ to generate the common IF band signal $S_{IF_{n,Q}}$.

Each of the bandpass filters $166^{1,I}$-$166^{n,Q}$ has an input terminal connected to an output terminal of a corresponding one of the mixers $162^{1,I}$-$164^{n,Q}$ and bandpass-filters an output of the corresponding one of the mixers $162^{1,I}$-$164^{n,Q}$ to remove unnecessary signal components.

The second frequency converter 180 may include (2n−1) mixers $182^{1,Q}$-$182^{n,Q}$ and 2n bandpass filters $184^{1,I}$-$184^{n,Q}$. The mixer $182^{1,Q}$ mixes the common IF band signal $S_{IF_{1,Q}}$ with an offset oscillation signal having a frequency of $\Delta f$ to generate the IF signal $S_{BB_{1,Q}}$. The mixer $182^{2,I}$ mixes the common IF band signal $S_{IF_{2,I}}$ with an offset oscillation signal having a frequency of $2\Delta f$ to generate the IF signal $S_{BB_{2,I}}$, and the mixer $182^{2,Q}$ mixes the common IF band signal $S_{IF_{2,Q}}$ with an offset oscillation signal having a frequency of $3\Delta f$ to generate the IF signal $S_{BB_{2,Q}}$. In this way, the mixer $182^{n,I}$ mixes the common IF band signal $S_{IF_{n,I}}$ with an offset oscillation signal having a frequency of $(2n−2)\Delta f$ to generate the IF signal $S_{BB_{n,I}}$, and the mixer $182^{n,Q}$ mixes the common IF band signal $S_{IF_{n,Q}}$ with an offset oscillation signal having a frequency of $(2n−1)\Delta f$ to generate the IF signal $S_{BB_{n,Q}}$. Each of the bandpass filters $184^{1,I}$-$184^{n,Q}$ bandpass-filters the IF signals $S_{BB_{1,I}}$-$S_{BB_{n,Q}}$ to remove unnecessary signal components. Here, the first bandpass filter $184^{1,I}$ which filters the IF signal $S_{BB_{1,I}}$ for which no mixing operation may be performed may be omitted.

Figure 11:
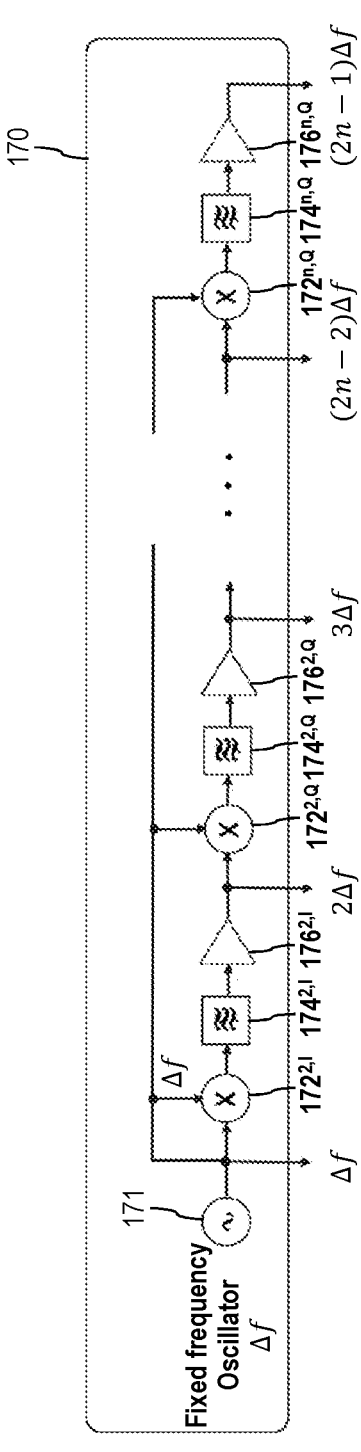
FIG. 11 is a detailed block diagram of a multiple-frequency local oscillation signal generator shown in FIGS. 9 and 10.

FIG. 11 is a detailed block diagram of a multiple-frequency LO signal generator 170 shown in FIGS. 9 and 10. In the present embodiment, the multiple-frequency LO signal generator 170 may include an oscillator 171, (2n−2) mixers $172^{2,I}$-$172^{n,Q}$, (2n−2) bandpass filters $174^{2,I}$-$174^{n,Q}$, and (2n−2) amplifiers $176^{2,I}$-$176^{n,Q}$.

The oscillator 171 generates the offset oscillation signal having the offset frequency $\Delta f$. The mixer $172^{1,Q}$ may mix the offset oscillation signal with a branched offset oscillation signal to generate the offset oscillation signal having the frequency of 2Δf. The bandpass filter $174^{1,Q}$ may bandpass-filter the output signal of the mixer $172^{1,Q}$ to remove unnecessary signal components. The amplifier $176^{1,Q}$ may amplify the output signal of the bandpass filter $174^{1,Q}$ to compensate for any signal attenuation in the mixer $172^{1,Q}$ and/or the bandpass filter $174^{1,Q}$.

The mixer $172^{2,I}$ may mix the offset oscillation signal output by the amplifier $176^{1,Q}$ and having the frequency of 2Δf with the offset oscillation signal to generate the offset oscillation signal having the frequency of 3Δf. The bandpass filter $174^{2,I}$ may bandpass-filter the output signal of the mixer $172^{2,I}$, and the amplifier $176^{2,I}$ may amplify the output signal of the bandpass filter $174^{2,I}$. The mixer $172^{2,Q}$ may mix the offset oscillation signal output by the amplifier $176^{2,I}$ and having the frequency of 3Δf with the offset oscillation signal to generate the offset oscillation signal having the frequency of 4Δf. The bandpass filter $174^{2,Q}$ may bandpass-filter the output signal of the mixer $172^{2,Q}$, and the amplifier $176^{2,Q}$ may amplify the output signal of the band-pass filter $174^{2,Q}$.

Therefore, a circuit of each stage including a combination of a mixer, a bandpass filter, and an amplifier connected in series may generate the offset oscillation signal whose frequency is additionally increased by the offset frequency Δf compared with the output of the circuit of a previous stage.

The frequency downconversion process according to the present embodiment will now be described in more detail.

The I-channel common IF band signal $S_{IF_I}(t)$ output by the first frequency converter 160 for the RF receive signal of the m-th path may be expressed by Equation 10.

$$S_{IF_I} = \frac{1}{2}A_k \cdot$$ [Equation 10]

$$\cos\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k)\right)$$

The offset oscillation signal $LO_{m,I}(t)$ for use in the mixing of the I-channel of the m-th path may be expressed by Equation 11. A band-converted I-channel IF signal $S_{BB_I}(t)$ may be expressed by Equation 12.

$$LO_{m,I}(t) = \cos(2\pi(m\Delta f)t)$$ [Equation 11]

$$S_{BB_I}(t) = S_{IF_i}(t) \cdot LO_{m,I}(t)$$ [Equation 12]

$$= \frac{1}{2}A_k \cdot \cos\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k)\right) \cdot \cos(2\pi(m\Delta f)t)$$

$$= \frac{1}{4}A_k \cdot \left\{\begin{array}{l}\cos\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k) - 2\pi(m\Delta f)t\right) + \\ \cos\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k) + 2\pi(m\Delta f)t\right)\end{array}\right\}$$

$$= \frac{1}{4}A_k \cdot \left\{\begin{array}{l}\cos\left(2\pi\left(m\Delta f - \frac{BW}{T_c}\tau_k\right)t - 2\pi f_0\tau_k + 2\pi\frac{1}{2}\frac{BW}{T_c}\tau_k^2 - \phi_0(t) + \phi_0(t-\tau_k)\right) + \\ \cos\left(2\pi\left(m\Delta f + \frac{BW}{T_c}\tau_k\right)t + 2\pi f_0\tau_k - 2\pi\frac{1}{2}\frac{BW}{T_c}\tau_k^2 + \phi_0(t) - \phi_0(t-\tau_k)\right)\end{array}\right\}$$

The final IF signal $S_{BB_{m,I}}$ output by the second frequency converter 180 after $$m\Delta f - \frac{BW}{T_c}\tau_k$$

frequency components are removed and only $$m\Delta f + \frac{BW}{T_c}\tau_k$$

frequency components are extracted by the bandpass filter 184$^{m,I}$ may be expressed by Equation 13.

$$s_{BB_I}(t) = \frac{1}{4}A_k \cdot \cos\left(2\pi\left(m\Delta f + \frac{BW}{T_c}\tau_k\right)t + \right.$$
$$\left. 2\pi f_0\tau_k - 2\pi\frac{1}{2}\frac{BW}{T_c}\tau_k^2 + \phi_0(t) - \phi_0(t-\tau_k)\right) \qquad \text{[Equation 13]}$$

As can be seen in the above equation, if the frequency band of each RF receive signal is first converted to the common IF band by using the LO signal having the frequency of $f_1$ and then the frequency band is upconverted by using the offset oscillation signal having the frequency of $m\Delta f$, the frequency band of the IF signal moves by $m\Delta f$ on the frequency axis. Thus, if the frequency of the LO signal used for the frequency conversion for each path is different from the frequency for the previous path by $\Delta f$, the position of the frequency band occupied by each IF signal is changed so that the signals can be combined on the frequency axis without changing other parameters.

The Q-channel IF signal $S_{BB_Q}(t)$ for the Q-channel of the m-th path may also be calculated as follows similarly to the I-channel of the m-th path.

The Q-channel common IF band signal $S_{IF_Q}(t)$ output by the first frequency converter 160 for the RF receive signal of the m-th path may be expressed by Equation 14.

$$S_{IF_Q}(t) = \frac{1}{2}A_k \cdot$$
$$\sin\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k)\right) \qquad \text{[Equation 14]}$$

The offset oscillation signal $LO_{m,Q}(t)$ for use in the mixing of the Q-channel of the m-th path may be expressed by Equation 15. A band-converted Q-channel IF signal $S_{BB_Q}(t)$ may be expressed by Equation 16.

$$LO_{m,Q}(t) = \cos(2\pi(m\Delta f)t) \qquad \text{[Equation 15]}$$

$$S_{BB_Q}(t) = S_{IF_Q}(t) \cdot LO_{m,Q}(t) \qquad \text{[Equation 16]}$$

$$= \frac{1}{2}A_k \cdot \sin\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k)\right) \cdot \cos(2\pi(m\Delta f)t)$$

$$= \frac{1}{4}A_k \cdot \left\{ \begin{array}{l} \sin\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k) + 2\pi(m\Delta f)t\right) + \\ \sin\left(2\pi\frac{BW}{T_c}\tau_k t + 2\pi f_0\tau_k - 2\pi\frac{1}{2}\frac{BW}{T_c}\tau_k^2 + \phi_0(t) - \phi_0(t-\tau_k) - 2\pi(m\Delta f)t\right) \end{array} \right\}$$

$$= \frac{1}{4}A_k \cdot \left\{ \begin{array}{l} \sin\left(2\pi\left(m\Delta f + \frac{BW}{T_c}\tau_k\right)t + 2\pi f_0\tau_k - 2\pi\frac{1}{2}\frac{BW}{T_c}\tau_k^2 + \phi_0(t) - \phi_0(t-\tau_k)\right) + \\ \sin\left(2\pi\left(m\Delta f - \frac{BW}{T_c}\tau_k\right)t - 2\pi f_0\tau_k + 2\pi\frac{1}{2}\frac{BW}{T_c}\tau_k^2 - \phi_0(t) + \phi_0(t-\tau_k)\right) \end{array} \right\}$$

The final IF signal $S_{BB_{m,Q}}$ output by the second frequency converter 180 after $$m\Delta f - \frac{BW}{T_c}\tau_k$$

frequency components are removed and only the $$m\Delta f + \frac{BW}{T_c}\tau_k$$

frequency components are extracted by the bandpass filter 184$m$,Q may be expressed by Equation 17.

$$s_{BB_Q}(t) = \frac{1}{4}A_k \cdot \sin\left(2\pi\left(m\Delta f + \frac{BW}{T_c}\tau_k\right)t + \right.$$
$$\left. 2\pi f_0\tau_k - 2\pi\frac{1}{2}\frac{BW}{T_c}\tau_k^2 + \phi_0(t) - \phi_0(t-\tau_k)\right)$$

[Equation 17]

For the Q-channel also, if the frequency band of each RF receive signal is first converted to the common IF band by using the LO signal having the frequency of $f_1$ and then the frequency band is upconverted by using the offset oscillation signal having the frequency of $m\Delta f$, the frequency band of the IF signal moves by $m\Delta f$ on the frequency axis. Thus, if the frequency of the LO signal used for the frequency conversion for each path is different from the frequency for the previous path by $\Delta f$, the position of the frequency band occupied by each IF signal is changed so that the signals can be combined on the frequency axis without changing other parameters.

The operation of the digital signal processor according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A radar apparatus, comprising:
   a transmit circuit configured to generate a radio frequency (RF) transmit signal based on a local oscillation signal and comprising a transmit antenna radiating a transmit electromagnetic signal corresponding to the RF transmit signal;
   a receive circuit configured to detect, through a plurality of antennas, receive electromagnetic signals that the transmit electromagnetic signal was reflected by a target and propagated toward the radar apparatus and amplify detected signals to acquire n-tuple RF receive signals (where n is a natural number greater than or equal to 2);
   a frequency downconverter configured to convert each of the RF receive signals into an in-phase (I)-channel intermediate frequency (IF) signal and a quadrature (Q)-channel IF signal such that frequency bands of 2n IF signals for the RF receive signals are sequentially displaced by a predetermined offset frequency;
   an analog-to-digital converter configured to perform an analog-to-digital conversion of a single IF signal into which the 2n IF signals are combined to generate a single digital signal stream; and
   a digital signal processor configured to processes the digital signal stream to extract target information,
   wherein the frequency downconverter is configured to convert a frequency band of each RF receive signal into a first IF band to generate the I-channel IF signal, and shift a phase of the RF receive signal by 90 degrees and convert a frequency band of a phase-shifted RF receive signal into a second IF band different from the first IF band to generate the Q-channel IF signal,
   wherein the frequency downconverter is configured to convert the RF receive signals into the 2n IF signals such that 2n IF bands of the 2n IF signals are sequentially displaced in a frequency domain by the predetermined offset frequency,
   wherein the receive circuit comprises:
   the plurality of antennas each configured to detect one of the electromagnetic signals and convert a detected electromagnetic signal into an electrical signal to output one of the RF receive signals; and
   a plurality of low noise amplifiers each configured to amplify a corresponding one of the RF receive signals, and
   wherein the frequency downconverter is configured to include: a multiple-frequency local oscillation signal generator configured to generate (2n−1) adjusted oscillation signals having frequencies sequentially added with the predetermined offset frequency from a base frequency of the local oscillation signal and output 2n oscillation signals including the local oscillation signal and the adjusted oscillation signals, wherein the 2n oscillation signals comprises n-tuple oscillation signal pairs of two oscillation signals being out of phase by 90 degrees from each other; and a frequency conversion circuit configured to mix each of the RF receive signals with two oscillation signals of a corresponding oscillation signal pair among the 2n oscillation signals to generate the 2n IF signals; or the frequency downconverter is configured to include: a first frequency converter configured to mix each of the RF receive signals with the local oscillation signal and a phase-shifted local oscillation signal whose phase is shifted by 90 degrees from the local oscillation signal to generate 2n common IF band signals; a multiple-frequency local oscillation signal generator configured to generate (2n−1) offset oscillation signals having frequencies sequentially added with the offset frequency from the offset frequency; and a second frequency converter configured to mix each of a second and subsequent common IF band signals among the 2n common IF band signals with the (2n−1) offset oscillation signals, respectively, to generate the 2n IF signals including a first common IF band signal.

2. The radar apparatus of claim 1, wherein the predetermined offset frequency is set to be equal to a signal bandwidth of a beat frequency of the radar apparatus.

3. The radar apparatus of claim 1, wherein the predetermined offset frequency is set to be greater than a signal bandwidth of a beat frequency of the radar apparatus.

4. A signal processing method in a radar apparatus, comprising:

detecting, by a plurality of antennas, electromagnetic signals that a transmit electromagnetic signal was reflected by a target and propagated toward the radar apparatus and amplifying detected signals to acquire n-tuple radio frequency (RF) receive signals (where n is a natural number greater than or equal to 2);

converting each of the RF receive signals into an in-phase (I)-channel intermediate frequency (IF) signal and a quadrature (Q)-channel IF signal such that frequency bands of 2n IF signals for the RF receive signals are different from each other;

combining the 2n IF signals to obtain a single IF signal and performing an analog-to-digital conversion of the single IF signal to generate a single digital signal stream; and processing the digital signal stream to extract target information, wherein converting each of the RF receive signals into the I-channel IF signal and the Q-channel IF signal comprises:

converting a frequency band of each RF receive signal into a first IF band to generate the I-channel IF signal; and shifting a phase of the RF receive signal by 90 degrees and converting a frequency band of a phase-shifted RF receive signal into a second IF band different from the first IF band to generate the Q-channel IF signal, wherein the RF receive signals are converted into the 2n IF signals such that 2n IF bands of the 2n IF signals are sequentially displaced in a frequency domain by a predetermined offset frequency, and wherein converting each of the RF receive signals into the I-channel IF signal and the Q-channel IF signal comprises: generating 2n oscillation signals including the local oscillation signal used for generating the transmit electromagnetic signal and (2n−1) adjusted oscillation signals having frequencies sequentially added with the predetermined offset frequency from a base frequency of the local oscillation signal, wherein the 2n oscillation signals comprises n-tuple oscillation signal pairs of two oscillation signals being out of phase by 90 degrees from each other; and mixing each of the RF receive signals with two oscillation signals of a corresponding oscillation signal pair among the 2n oscillation signals to generate the 2n IF signals; or converting each of the RF receive signals into the I-channel IF signal and the Q-channel IF signal comprises: mixing each of the RF receive signals with the local oscillation signal used for generating the transmit electromagnetic signal and a phase-shifted local oscillation signal whose phase is shifted by 90 degrees from the local oscillation signal to generate 2n common IF band signals; and converting the 2n common IF band signals into the 2n IF signals in respective IF bands sequentially displaced by the predetermined offset frequency.

5. The signal processing method of claim 4, wherein the predetermined offset frequency is set to be equal to a signal bandwidth of a beat frequency of the radar apparatus.

6. The signal processing method of claim 4, wherein the predetermined offset frequency is set to be greater than a signal bandwidth of a beat frequency of the radar apparatus.

7. The signal processing method of claim 4, wherein converting the 2n common IF band signals into the 2n IF signals comprises:

generating (2n−1) offset oscillation signals having frequencies sequentially added with the predetermined offset frequency from the predetermined offset frequency; and mixing each of a second and subsequent common IF band signals among the 2n common IF band signals with the (2n−1) offset oscillation signals, respectively, to generate the 2n IF signals including a first common IF band signal.

* * * * *